United States Patent
French et al.

(10) Patent No.: US 12,403,978 B2
(45) Date of Patent: Sep. 2, 2025

(54) STEERING ASSEMBLY FOR MICROMOBILITY TRANSIT VEHICLES

(71) Applicant: Lyft, Inc., San Francisco, CA (US)

(72) Inventors: Merric-Andrew Jaranowski French, San Francisco, CA (US); Andrew Michael Reimer, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 18/438,243

(22) Filed: Feb. 9, 2024

(65) Prior Publication Data

US 2024/0182132 A1 Jun. 6, 2024

Related U.S. Application Data

(63) Continuation of application No. 17/450,116, filed on Oct. 6, 2021, now Pat. No. 11,919,600.

(60) Provisional application No. 63/127,659, filed on Dec. 18, 2020.

(51) Int. Cl.
*B62K 21/10* (2006.01)
*B62K 21/02* (2006.01)
*B62K 21/12* (2006.01)

(52) U.S. Cl.
CPC .............. *B62K 21/10* (2013.01); *B62K 21/02* (2013.01); *B62K 21/12* (2013.01)

(58) Field of Classification Search
CPC .......... B62K 21/22; B62K 21/12; B62K 21/18
See application file for complete search history.

(56) References Cited

U.S. PATENT DOCUMENTS

| | | | |
|---|---|---|---|
| 6,186,027 B1* | 2/2001 | Nielsen ................. | B62K 21/18 403/365 |
| 6,711,966 B2* | 3/2004 | Chuang .................... | B62J 6/03 74/551.8 |
| 7,645,087 B1* | 1/2010 | Lin ........................ | B62K 21/18 403/109.5 |
| 9,615,472 B1* | 4/2017 | Calfee .................... | B62J 11/19 |
| 10,703,431 B2* | 7/2020 | French ................... | B62K 21/22 |
| 2007/0170690 A1* | 7/2007 | Hermansen ............... | B62K 1/00 280/280 |
| 2009/0283985 A1* | 11/2009 | Lane ...................... | B62K 19/32 280/279 |

* cited by examiner

*Primary Examiner* — Valentin Neacsu
*Assistant Examiner* — Hosam Shabara
(74) *Attorney, Agent, or Firm* — Baker Botts L.L.P.

(57) ABSTRACT

In one embodiment, a micromobility transit vehicle may include a steering assembly. The steering assembly may include a steer tube configured to rotate within a headtube of the micromobility transit vehicle, and a stiffening brace positioned about the headtube. A stem may be coupled to the steer tube and the stiffening brace and configured to rotationally lock the stem and the stiffening brace together. A preload assembly may be coupled to the steering assembly and the stem and configured to adjust a preload of the steering assembly.

19 Claims, 21 Drawing Sheets

STEERING ASSEMBLY FOR MICROMOBILITY TRANSIT VEHICLES

PRIORITY

This application is a continuation under 35 U.S.C. § 120 of U.S. patent application Ser. No. 17/450,116, filed 6 Oct. 2021, which claims the benefit under 35 U.S.C. § 119(e) of U.S. Provisional Patent Application No. 63/127,659, filed 18 Dec. 2020, which are incorporated herein by reference.

TECHNICAL FIELD

One or more embodiments of the present disclosure relate generally to steering assemblies and more particularly, for example, to a steering assembly for micromobility transit vehicles.

BACKGROUND

Micromobility transit vehicles for hire (e.g., shared scooter, sit-scooters, bicycles, etc.) are subject to repeated use under a wide range of load requirements (e.g., varying rider weights and loads attached to the vehicle, etc.). The steering assembly must be robust to account for the expected loads. To satisfy the load requirements, some steering designs are large in both mass and packaging volume.

Therefore, there is a need in the art for systems and methods that address the deficiencies noted above, other deficiencies known in the industry, or at least offers an alternative to current techniques. For example, improvements are needed for a steering assembly design that densifies one or more mechanical connections to reduce both mass and packaging volume compared to legacy designs.

SUMMARY

Techniques are disclosed for a steering assembly for micromobility transit vehicles. In accordance with one or more embodiments, a micromobility transit vehicle is provided. The micromobility transit vehicle may include a steering assembly. The steering assembly may include a fork, a steer tube extending from the fork, a stiffening brace extending from the fork, and a stem coupled to the steer tube and the stiffening brace. The steer tube may be positioned to rotate within a headtube of the micromobility transit vehicle. The stiffening brace may be positioned about the headtube. The stiffening brace may include a first engagement surface. The stem may include a second engagement surface complementary to the first engagement surface and engaged with the first engagement surface to rotationally lock the stem and stiffening brace together.

One or more embodiments provide a method of coupling a steering assembly to a micromobility transit vehicle. The method may include positioning a steer tube of a steering assembly through a headtube of a frame of a micromobility transit vehicle. The steer tube may extend from a fork of the steering assembly. The method may include positioning a stiffening brace of the steering assembly about the headtube. The stiffening brace may extend from the fork. The method may include coupling a stem to the steer tube and the stiffening brace to secure the steering assembly to the headtube. The coupling may include engaging complementary engagement surfaces of the stem and the stiffening brace to rotationally lock the stem and stiffening brace together.

Additional features are set forth in part in the description that follows and will become apparent to those skilled in the art upon examination of the specification and drawings or may be learned by the practice of the disclosed subject matter. A further understanding of the nature and advantages of the present disclosure may be realized by reference to the remaining portions of the specification and the drawings, which forms a part of this disclosure.

One of skill in the art will understand that each of the various aspects and features of the disclosure may advantageously be used separately in some instances, or in combination with other aspects and features of the disclosure in other instances. In addition, various aspects and features may be omitted. Accordingly, individual aspects can be claimed separately or in combination with other aspects and features. Thus, the present disclosure is merely exemplary in nature and is in no way intended to limit the claimed invention or its applications or uses. It is to be understood that structural and/or logical changes may be made without departing from the spirit and scope of the present disclosure.

The present disclosure is set forth in various levels of detail and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. Moreover, for the purposes of clarity, detailed descriptions of certain features will not be discussed when they would be apparent to those with skill in the art so as not to obscure the description of the present disclosure. The claimed subject matter is not necessarily limited to the arrangements illustrated herein, with the scope of the present disclosure is defined only by the appended claims.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

The present disclosure is generally directed toward a steering design that densifies the mechanical stem connection to, for example, reduce both mass and packaging volume. The steering assembly includes a fork, a steer tube extending from the fork, and a stiffening brace extending from the fork adjacent to the steer tube. The stiffening brace may extend parallel to the steer tube and may be shaped to extend around the headtube of the vehicle's frame. For example, the stiffening brace may include a concave inner surface that is shaped to fit around a convex outer surface of the headtube.

The steering assembly may include a stem connected to the steer tube and the stiffening brace. The stem may be connected to the stiffening brace via a planar shear joint. The planar shear joint may be low profile to fit beneath a cosmetic cockpit plastic (e.g., housing). The stiffening brace may be secured to the stem using one or more fasteners, with the fasteners received through vertically slotted holes of the stiffening brace to allow for vertical adjustment (e.g., headset bearing preload). The planar shear joint rotationally locks (e.g., clocks) the stem and stiffening brace together while allowing the steering assembly to rotate about the steer axis defined by the steer tube. The stem may be connected to the steer tube via a pinch joint. For example, after the shear joint is secured, the circumference of the stem's bore may be pinched around the steer tube to complete the mechanical connection of the upper and lower steering.

The steering assembly may include a preload assembly that adjusts the headset bearing preload. The preload assembly may include a cross pin and a bridge threaded to the cross pin (e.g., via a bolt) and adjustable to draw the stem and fork together to apply axial preload to the headset bearings. The cross pin may be defined in or secured to the steer tube. The bridge may engage the stem, such as seated within a portion of the stem.

A lock triangle may be secured to the stiffening brace to couple the micromobility transit vehicle to a docking station. The lock triangle may pivot about a pin to account for ground surface and docking station variances. The lock triangle may be held in a neutral position via a spring. The spring may include a pair of spring arms received within the lock triangle and a loop nested within a cavity disposed in or adjacent to the stiffening brace. The lengths of the spring arms and loop may be selected to provide repeatable positioning of the lock triangle with respect to the ground (e.g., a ground plane).

Figure 1:
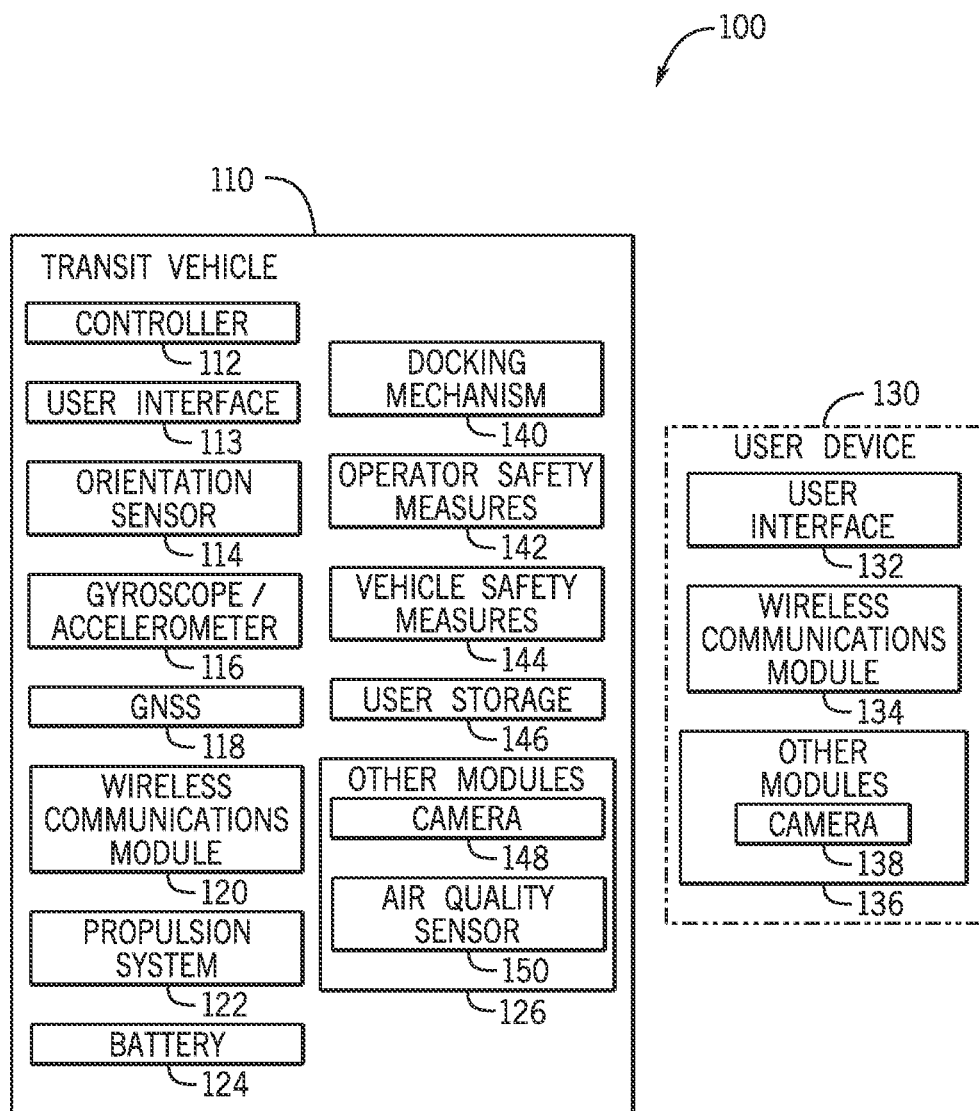
FIG. 1 illustrates a block diagram of a portion of a dynamic transportation matching system including a transit vehicle, in accordance with an embodiment of the disclosure.

FIG. 1 illustrates a block diagram of a portion of a dynamic transportation matching system 100 (e.g., system 100) including a transit vehicle 110 in accordance with an embodiment of the disclosure. In the embodiment shown in FIG. 1, system 100 includes transit vehicle 110 and optionally a user device 130. In general, transit vehicle 110 may be a passenger vehicle designed to transport a single person (e.g., a micromobility transit vehicle, a transit bike and scooter vehicle, or the like) or a group of people (e.g., a typical car or truck). More specifically, transit vehicle 110 may be implemented as a motorized or electric kick scooter, bicycle, and/or motor scooter designed to transport one or perhaps two people at once typically on a paved road (collectively, micromobility transit vehicles), as a typical automobile configured to transport up to 4, 7, or 10 people at once, or according to a variety of different transportation modalities (e.g., transportation mechanisms). Transit vehicles similar to transit vehicle 110 may be owned, managed, and/or serviced primarily by a fleet manager/servicer providing transit vehicle 110 for rental and use by the public as one or more types of transportation modalities offered by a dynamic transportation matching system, for example. In some embodiments, transit vehicles similar to transit vehicle 110 may be owned, managed, and/or serviced by a private owner using the dynamic transportation matching system to match their vehicle to a transportation request, such as with ridesharing or ridesourcing applications typically executed on a mobile user device, such as user device 130 as described herein. User device 130 may be a smartphone, tablet, near field communication (NFC) or radio-frequency identification (RFID) enabled smart card, or other personal or portable computing and/or communication device that may be used to facilitate rental and/or operation of transit vehicle 110.

As shown in FIG. 1, transit vehicle 110 may include one or more of a controller 112, a user interface 113, an orientation sensor 114, a gyroscope/accelerometer 116, a global navigation satellite system (GNSS) receiver 118, a wireless communications module 120, a camera 148, a propulsion system 122, an air quality sensor 150, and other modules 126. Operation of transit vehicle 110 may be substantially manual, autonomous, and/or partially or completely controlled by user device 130, which may include one or more of a user interface 132, a wireless communications module 134, a camera 138, and other modules 136. In other embodiments, transit vehicle 110 may include any one or more of the elements of user device 130. In some embodiments, one or more of the elements of system 100 may be implemented in a combined housing or structure that can be coupled to or within transit vehicle 110 and/or held or carried by a user of system 100, such as a transportation requester or rider.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of transit vehicle 110 and/or other elements of system 100, for example. Such software instructions may also implement methods for processing images and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a transportation requester or rider via user interface 113 or 132. In some embodiments, controller 112 may be integrated with one or more other elements of transit vehicle 110, for example, or distributed as multiple logic devices within transit vehicle 110 and/or user device 130.

In some embodiments, controller 112 may be configured to substantially continuously monitor and/or store the status of and/or sensor data provided by one or more elements of transit vehicle 110 and/or user device 130, such as the position and/or orientation of transit vehicle 110 and/or user device 130, for example, and the status of a communication link established between transit vehicle 110 and/or user device 130. Such communication links may be established and then provide for transmission of data between elements of system 100 substantially continuously throughout operation of system 100, where such data includes various types of sensor data, control parameters, and/or other data.

User interface 113 of transit vehicle 110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 113 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of transit vehicle 110 and/or other elements of system 100. For example, user interface 113 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause transit vehicle 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of transit vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of transit vehicle 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of transit vehicle 110 (e.g., or an element of transit vehicle 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS receiver 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to directly or indirectly receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to transit vehicle 110 and to monitor the status of a communication link directly or indirectly established between transit vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to transit vehicle 110 and/or to steer transit vehicle 110. In some embodiments, propulsion system 122 may include elements that can be controlled (e.g., by controller 112 and/or user interface 113) to provide motion for transit vehicle 110 and to provide an orientation for transit vehicle 110. In various embodiments, propulsion system 122 may be implemented with a portable power supply, such as a battery. In some embodiments, propulsion system 122 may be implemented with a combustion engine/generator and fuel supply.

For example, in some embodiments, such as when propulsion system 122 is implemented by an electric motor (e.g., as with many micromobility transit vehicles), transit vehicle 110 may include battery 124. Battery 124 may be implemented by one or more battery cells (e.g., lithium ion battery cells) and be configured to provide electrical power to propulsion system 122 to propel transit vehicle 110, for example, as well as to various other elements of system 100, including controller 112, user interface 113, and/or wireless communications module 120. In some embodiments, battery 124 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of transit vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a transportation requester or rider and/or used by other devices of system 100 (e.g., controller 112) to provide operational control of transit vehicle 110 and/or system 100. In further embodiments, other modules 126 may include a light, such as a head light or indicator light, and/or an audible alarm, both of which may be activated to alert passersby to possible theft, abandonment, and/or other critical statuses of transit vehicle 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120. More generally, camera 148 may be configured to perform any of the operations or methods described herein, at least in part, or in combination with controller 112 and/or user interface 113 or 132.

In various embodiments, air quality sensor 150 may be implemented as an air sampling sensor configured to determine an air quality of an environment about transit vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micromobility transit vehicle, as described herein.

Transit vehicles implemented as micromobility transit vehicles may include a variety of additional features designed to facilitate fleet management and rider and environmental safety. For example, as shown in FIG. 1, transit vehicle 110 may include one or more of docking mechanism 140, operator safety measures 142, vehicle security device 144, and/or user storage 146, as described in more detail herein by reference to FIGS. 3A-C.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user, such as a transportation requester or rider. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of transit vehicle 110 and/or other elements of system 100. For example, user interface 132 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause transit vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to directly or indirectly transmit control signals from user interface 132 to wireless communications module 120 or 134. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or transit vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a transportation requester or rider and/or used by other devices of system 100 (e.g., controller 112) to provide operational control of transit vehicle 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for transit vehicle 110, using one or more power leads. Such power leads may also be used to support one or more communication techniques between elements of system 100.

Figure 2:
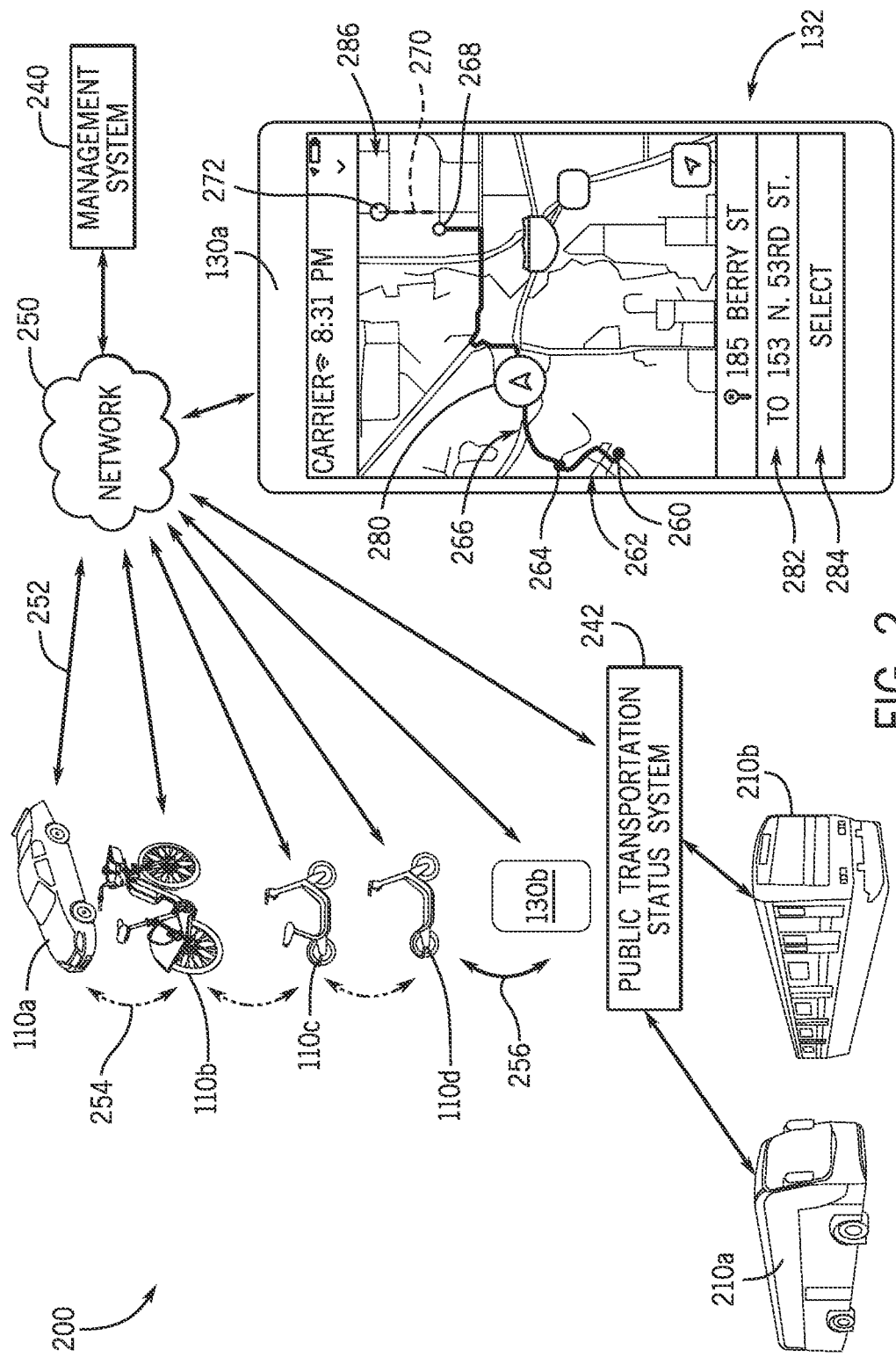
FIG. 2 illustrates a block diagram of a dynamic transportation matching system incorporating a variety of transportation modalities, in accordance with an embodiment of the disclosure.

FIG. 2 illustrates a block diagram of a dynamic transportation matching system 200 (or multimodal transportation system) incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes a management system/server 240 in communication with a number of transit vehicles 110a-d and user devices 130a-b over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes a public transportation status system 242 in communication with a variety of public transportation vehicles, including one or more buses 210a, trains 210b, and/or other public transportation modalities, such as ships, ferries, light rail, subways, streetcars, trolleys, cable cars, monorails, tramways, and aircraft. As shown in FIG. 2, all transit vehicles are able to communicate directly to WAN 250 and, in some embodiments, may be able to communicate across mesh network communication links 254, to convey fleet data and/or fleet status data amongst themselves and/or to and from management system 240.

In FIG. 2, user device 130a may receive an input with a request for transportation with one or more transit vehicles 110a-d and/or public transportation vehicles 210a-b. For example, the transportation request may be a request to use (e.g., hire or rent) one of transit vehicles 110a-d. The transportation request may be transmitted to management system 240 over WAN 250, allowing management system 240 to poll status of transit vehicles 110a-d and to select one of transit vehicles 110a-d to fulfill the transportation request. Upon or after one of the transit vehicles 110a-d is selected to fulfill the transportation request, a fulfillment notice from management system 240 and/or from the selected transit vehicle 110a-d may be transmitted to the user device 130a. In some embodiments, navigation instructions to proceed to or otherwise meet with the selected transit vehicle 110a-d may be sent to the user device 130a. A similar process may occur using user device 130b, but where the transportation request enables a transit vehicle over a local communication link 256, as shown.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of transit vehicles 110a-d, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among transit vehicles 110a-d, as described herein.

User device 130a in FIG. 2 includes a display of user interface 132 that shows a planned route for a transportation requester or rider attempting to travel from an origination point 260 to a destination 272 using different transportation modalities (e.g., a planned multimodal route), as depicted in a route/street map 286 rendered by user interface 132. For example, management system 240 may be configured to monitor statuses of all available transportation modalities (e.g., including transit vehicles and public transportation vehicles) and provide a planned multimodal route from origination point 260 to destination 272. Such a planned multimodal route may include, for example, a walking route 262 from origination point 260 to a bus stop 264, a bus route 266 from bus stop 264 to a bus stop 268 (e.g., using one or more of transit vehicles 210a or 210b), and a micromobility route 270 (e.g., using one or more of micromobility transit vehicles 110b, 110c, or 110d) from bus stop 268 to destination 272. Also shown rendered by user interface 132 are a present location indicator 280 (indicating a present absolute position of user device 130a on street map 286), a navigation destination selector/indicator 282 (e.g., configured to allow a transportation requester or rider to input a desired navigation destination), and a notice window 284 (e.g., used to render vehicle status data or other information, including user notices and/or alerts, as described herein). For example, a transportation requester or rider may use navigation destination selector/indicator 282 to provide and/or change destination 272, as well as change any portion (e.g., leg, route, etc.) or modality of the multimodal route from origination point 260 to destination 272. In some embodiments, notice window 284 may display instructions for traveling to a next waypoint along the determined multimodal route (e.g., directions to walk to a bus stop, directions to ride a micromobility transit vehicle to a next stop along the route, etc.).

In various embodiments, management system 240 may be configured to provide or suggest an optimal multimodal route to a transportation requester or rider (e.g., initially and/or while traversing a particular planned route), and a transportation requester or rider may select or make changes to such a route through manipulation of user device 130a, as shown. For example, management system 240 may be configured to suggest a quickest route, a least expensive route, a most convenient route (to minimize modality changes or physical actions a transportation requester or rider must take along the route), an inclement weather route (e.g., that keeps the transportation requester or rider protected from inclement weather a maximum amount of time during route traversal), or some combination of those that is determined as best suited to the transportation requester or rider, such as based on various user preferences. Such preferences may be based on prior use of system 200, prior user trips, a desired arrival time and/or departure time (e.g., based on user input or obtained through a user calendar or other data source), or specifically input or set by a user (e.g., a transportation requester or rider) for the specific route, for example, or in general. In one example, origination point 260 may be extremely congested or otherwise hard to access by a ride-share transit vehicle, which could prevent or significantly increase a wait time for the transportation requester or rider and a total trip time to arrive at destination 272. In such circumstances, a planned multimodal route may include directing the transportation requester or rider to walk and/or take a scooter/bike to an intermediate and less congested location to meet a reserved ride-share vehicle, which would allow the transportation requester or rider to arrive at destination 272 quicker than if the ride-share vehicle was forced to meet the transportation requester or rider at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
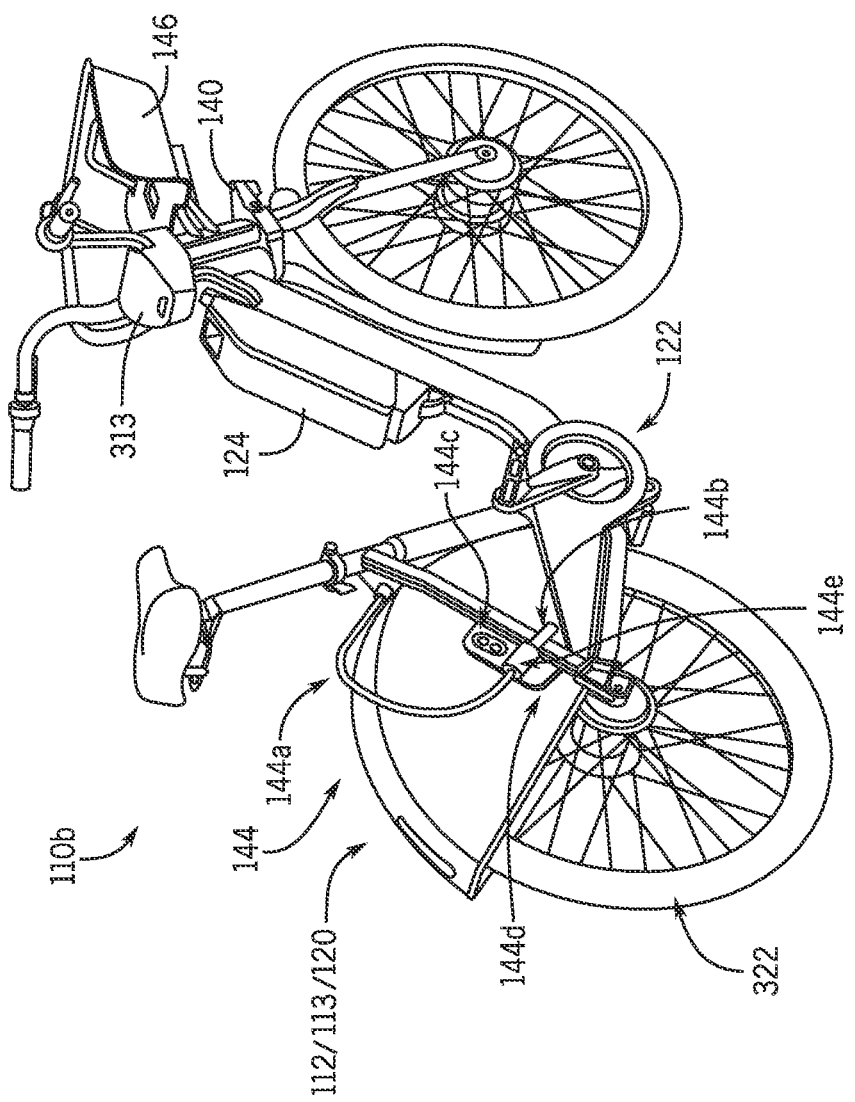
FIGS. 3A, 3B, and 3C illustrate respective diagrams of micromobility transit vehicles for use in a dynamic transportation matching system, in accordance with an embodiment of the disclosure.
Figure 3B:
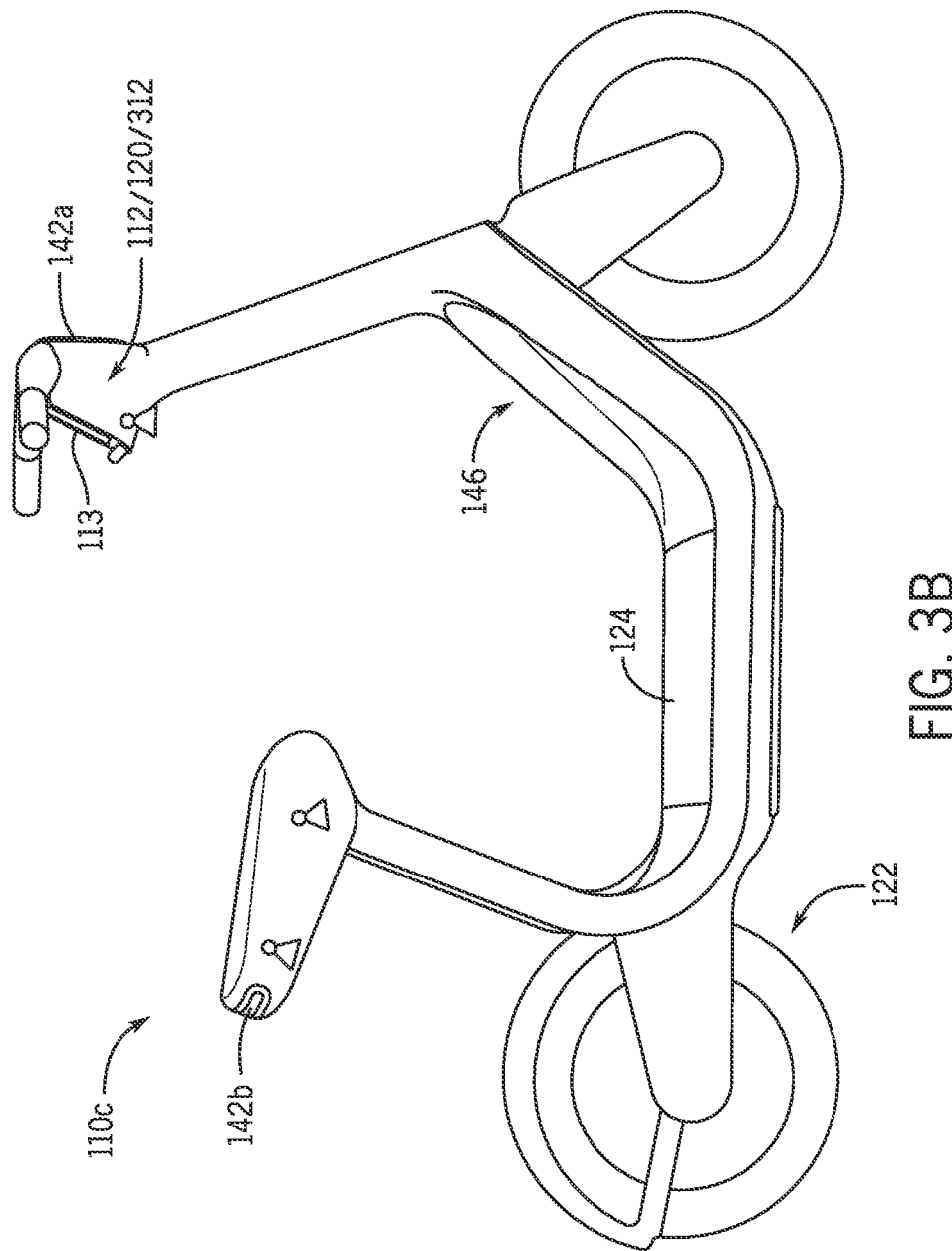
Figure 3C:
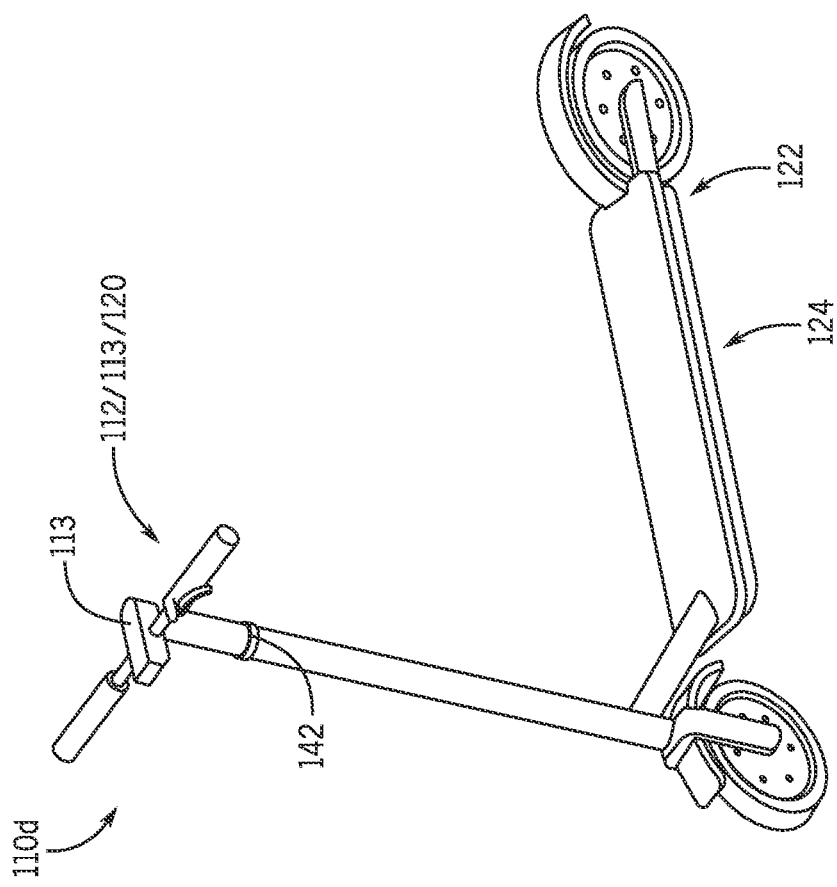

FIGS. 3A, 3B, and 3C illustrate respective diagrams of micromobility transit vehicles 110b, 110c, and 110d, which may be integrated network systems in accordance with an embodiment of the disclosure. For example, transit vehicle 110b of FIG. 3A may correspond to a motorized bicycle integrated with the various elements of system 100 and may be configured to participate in dynamic transportation matching system 200 of FIG. 2. As shown, transit vehicle 110b includes controller/user interface/wireless communications module 112/113/120 (e.g., integrated with a rear fender of transit vehicle 110b), propulsion system 122 configured to provide motive power to at least one of the wheels (e.g., a rear wheel 322) of transit vehicle 110b, battery 124 for powering propulsion system 122 and/or other elements of transit vehicle 110b, docking mechanism 140 (e.g., a spade lock assembly) for docking transit vehicle 110b at a docking station, user storage 146 implemented as a handlebar basket, and vehicle security device (e.g., an embodiment of vehicle security device 144 of FIG. 1), which may incorporate one or more of a locking cable 144a, a pin 144b coupled to a free end of locking cable 144a, a pin latch/insertion point 144c, a frame mount 144d, and a cable/pin holster 144c, as shown (collectively, vehicle security device 144). In some embodiments, controller/user interface/wireless communications module 112/113/120 may alternatively be integrated on and/or within a handlebar enclosure 313, as shown.

In some embodiments, vehicle security device 144 may be implemented as a wheel lock configured to immobilize rear wheel 322 of transit vehicle 110b, such as by engaging pin 144b with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144c. In various embodiments, vehicle security device 144 may be configured to immobilize transit vehicle 110b by default, thereby requiring a transportation requester or rider to transmit a request to management system 240 (e.g., via user device 130) to reserve transit vehicle 110b before attempting to use transit vehicle 110b. The request may identify transit vehicle 110b based on an identifier (e.g., a QR code, a barcode, a serial number, etc.) presented on transit vehicle 110b (e.g., such as by user interface 113 on a rear fender of transit vehicle 110b). Once the request is approved, management system 240 may transmit an unlock signal to transit vehicle 110b (e.g., via network 250). Upon receiving the unlock signal, transit vehicle 110b (e.g., controller 112 of transit vehicle 110b) may release vehicle security device 144 and unlock rear wheel 322 of transit vehicle 110b.

Transit vehicle 110c of FIG. 3B may correspond to a motorized sit-scooter integrated with the various elements of system 100 and may be configured to participate in dynamic transportation matching system 200 of FIG. 2. As shown in FIG. 3B, transit vehicle 110c includes many of the same elements as those discussed with respect to transit vehicle 110b of FIG. 3A. For example, transit vehicle 110c may include user interface 113, propulsion system 122, battery 124, controller/wireless communications module/cockpit enclosure 112/120/312, user storage 146 (e.g., implemented as a storage recess), and operator safety measures 142a and 142b, which may be implemented as various types of head lights, programmable light strips, and/or reflective strips.

Transit vehicle 110d of FIG. 3C may correspond to a motorized stand or kick scooter integrated with the various elements of system 100 and may be configured to participate in dynamic transportation matching system 200 of FIG. 2. As shown in FIG. 3C, transit vehicle 110d includes many of the same elements as those discussed with respect to transit vehicle 110b of FIG. 3A. For example, transit vehicle 110d may include user interface 113, propulsion system 122, battery 124, controller/wireless communications module/ cockpit enclosure 112/120/312, and operator safety measures 140, which may be implemented as various types programmable light strips and/or reflective strips, as shown.

Figure 3D:
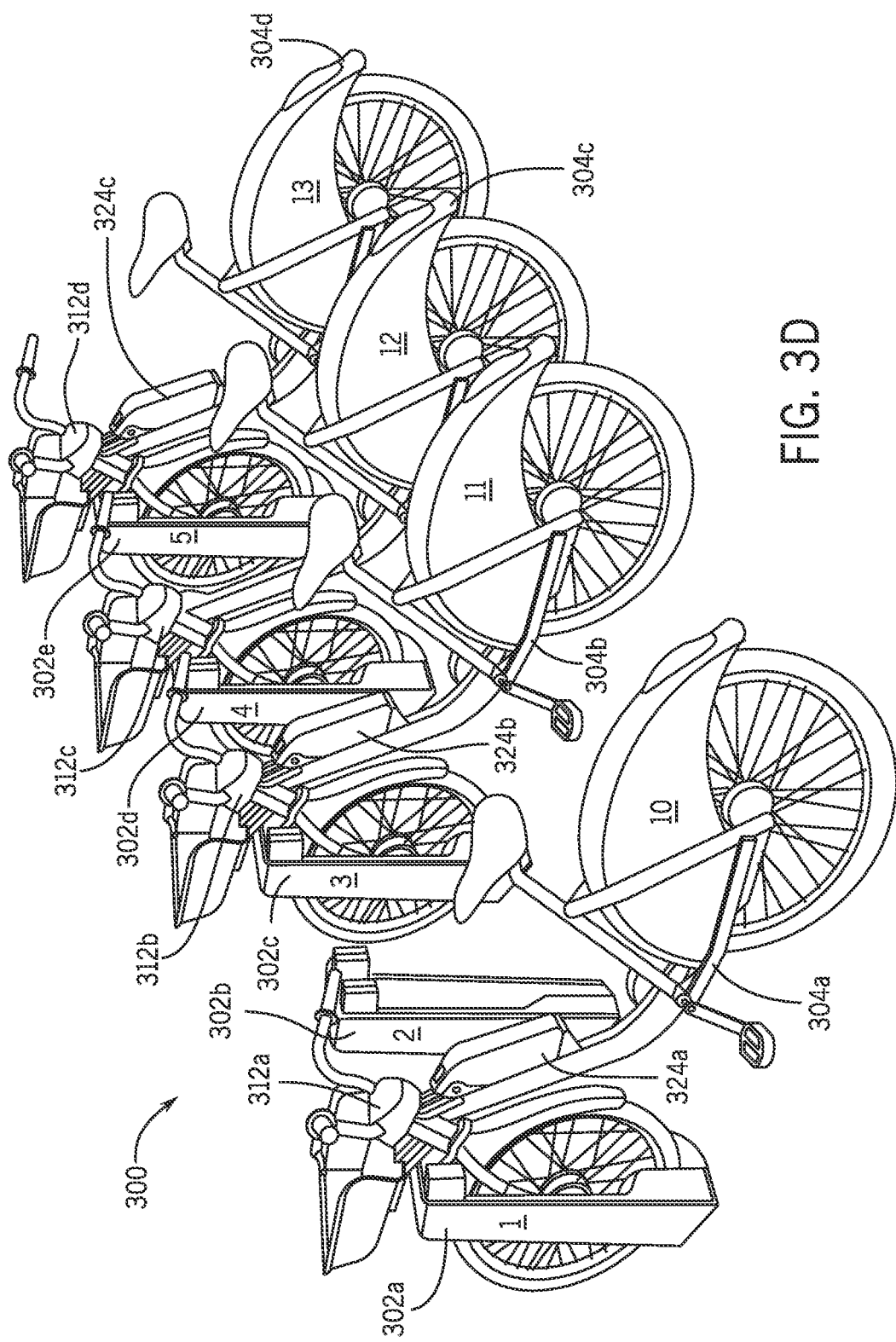
FIG. 3D illustrates a diagram of a docking station for docking one or more micromobility transit vehicles, in accordance with an embodiment of the disclosure.

FIG. 3D illustrates a docking station 300 for docking transit vehicles (e.g., transit vehicles 110c, 110e, and 110g, etc.) according to one embodiment. As shown, docking station 300 may include multiple bicycle docks, such as docks 302a-c. In this example, a single transit vehicle (e.g., any one of electric bicycles 304a-d) may dock in each of the docks 302a-e of the docking station 300. Each of the docks 302a-e may include a lock mechanism for receiving and locking docking mechanism 140 of the electric bicycles 304a-d. In some embodiments, once a transit vehicle is docked in a bicycle dock, the dock may be electronically coupled to the transit vehicle (e.g., controllers 312a-d of the transit vehicle) via a link such that the transit vehicle and the dock may communicate with each other via the link.

A transportation requester or rider may use a user device (e.g., user device 130) to use a micromobility transit vehicle 110b-d that is docked in one of the bicycle docks 302a-e by transmitting a request to management system 240. Once the request is processed, management system 240 may transmit an unlock signal to a micromobility transit vehicle 110b-d docked in the dock and/or the dock via network 250. The docking station 300 may automatically unlock the lock mechanism to release the micromobility transit vehicle 110b-d based on the unlock signal. In some embodiments, each of the docks 302a-e may also be configured to charge batteries (e.g., batteries 324a-c) of the electric bicycle 304a-d, respectively, when the electric bicycle 304a-d are docked at the docks 302a-c. In some embodiments, docking station 300 may also be configured to transmit information associated with the docking station 300 (e.g., a number of transit vehicles docked at the docking station 300, charge statuses of the docked transit vehicles, etc.) to the management system 240.

Figure 4:
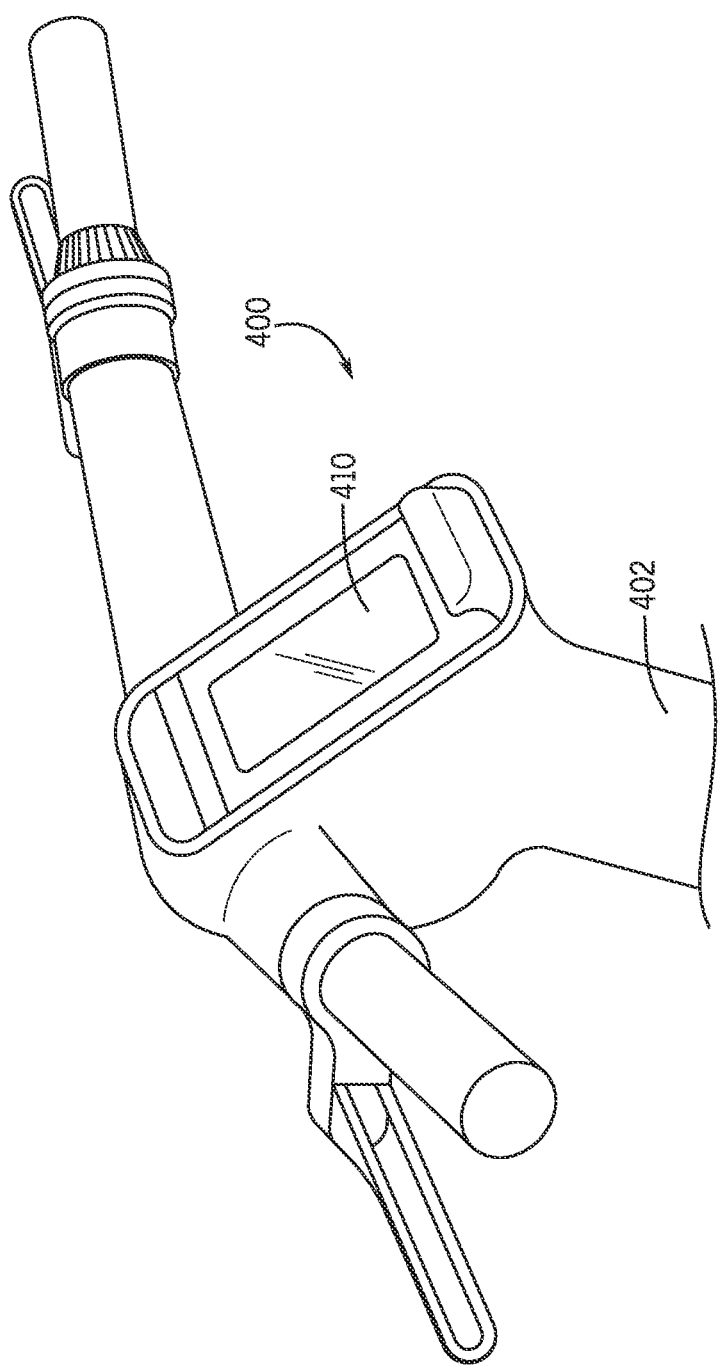
FIG. 4 illustrates a diagram of a user interface associated with a micromobility transit vehicle, in accordance with an embodiment of the disclosure.

FIG. 4 illustrates a diagram of a user interface 400 associated with a micromobility transit vehicle 402 in accordance with an embodiment of the disclosure. The micromobility transit vehicle 402 may be similar to any one of transit vehicles 110b, 110c, or 110d, described above. The user interface 400 may be integrated with the micromobility transit vehicle 402, such as integrated with at least a portion of a cockpit of the micromobility transit vehicle 402. In some embodiments, the user interface 400 may form at least a portion of an outer housing of the handlebar of the micromobility transit vehicle 402. The user interface 400 may be visible to the rider during operation. For instance, the user interface 400 may generally face rearwardly. The user interface 400 may include a display 410 configured to render information or other data. The display 410 may include many configurations, such as being an electronic ink display, although other configurations are contemplated. In other embodiments, the display 410 may be part of a mobile user computing device, such as a smart phone. As such, content, information, and data discussed herein as being presented on the display 410 can also or alternatively be displayed on the user computing device.

The user interface 400 may be similar to the user interface 113 or 132 described above. For example, route guidance information, usage cost, battery charge status, vehicle range, or other information related to the micromobility transit vehicle 402 may be rendered on the display 410. Information related to the operation of the micromobility transit vehicle 402, such as time information, map information, navigation information, instructions for operation, operational warnings or notifications, among others, may be rendered on the display 410. For example, one or more notifications may be rendered on the display 410 instructing or reminding the rider to properly lock and/or park the micromobility transit vehicle 402. In some embodiments, the user interface 400 may present information similar to that described in U.S.

patent application Ser. No. 16/578,995, entitled "MICRO-MOBILITY ELECTRIC VEHICLE WITH ELECTRONIC DEVICE HOLDER AND INTEGRATED DISPLAY," which is incorporated herein in its entirety for all purposes.

Figure 5A:
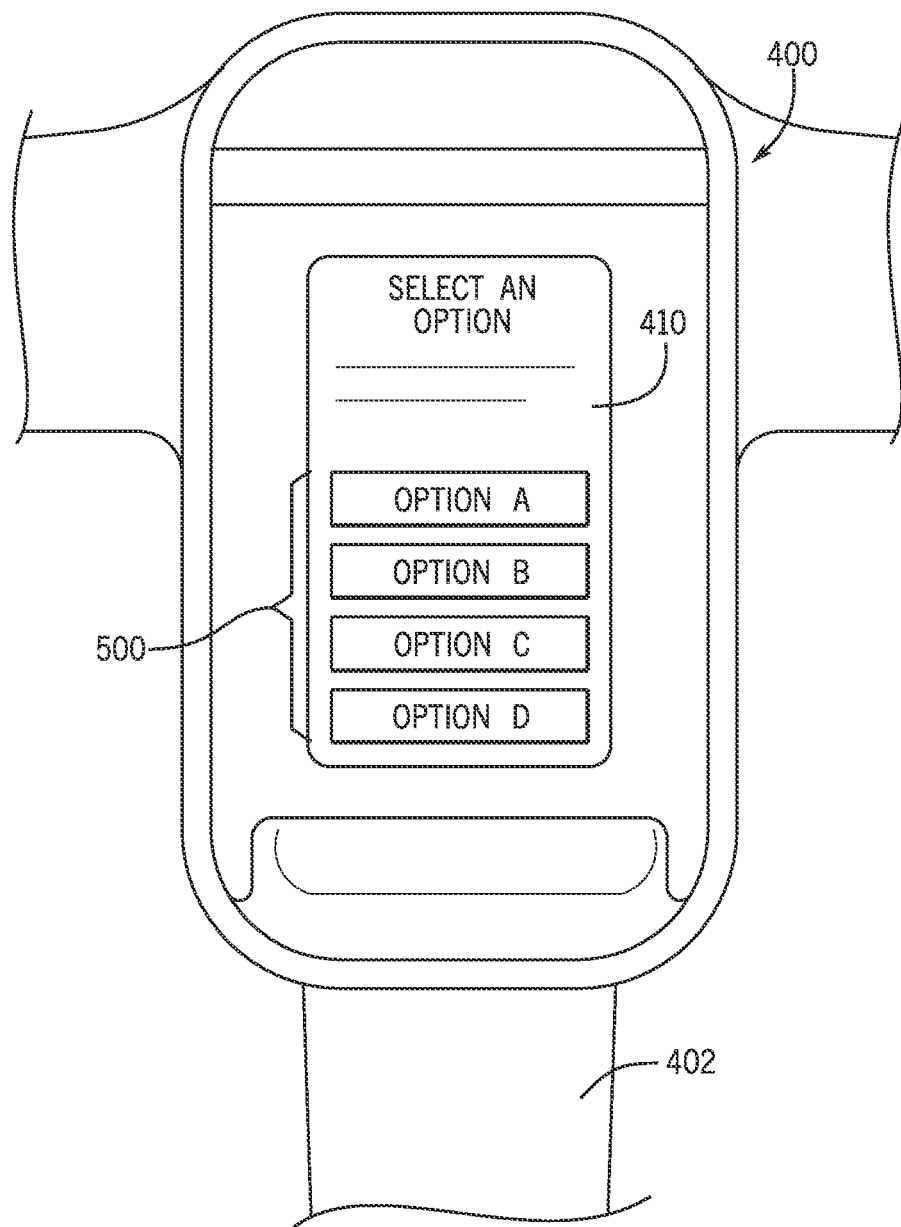
FIGS. 5A, 5B, and 5C illustrate respective diagrams of various examples of information rendered on a display of the user interface of FIG. 4, in accordance with an embodiment of the disclosure.
Figure 5B:
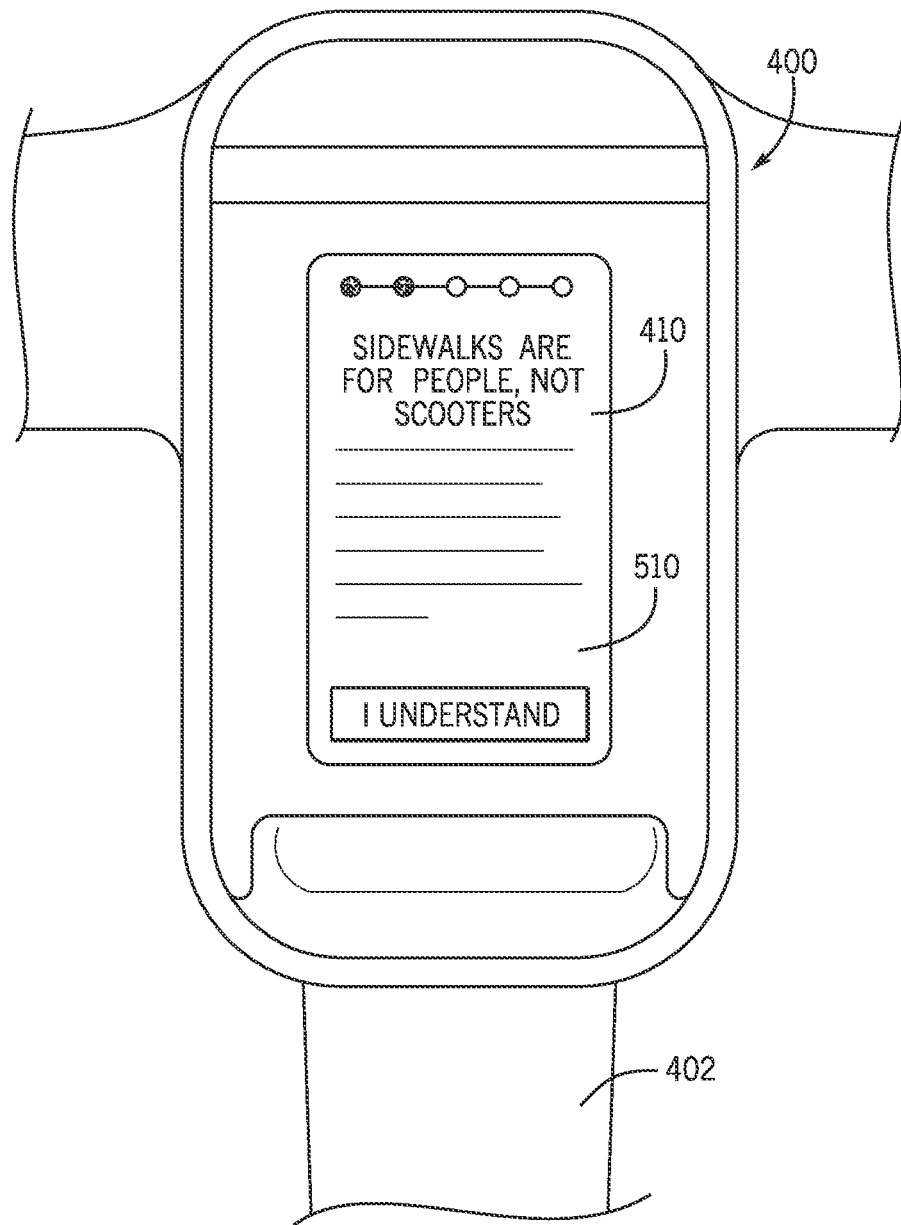
Figure 5C:
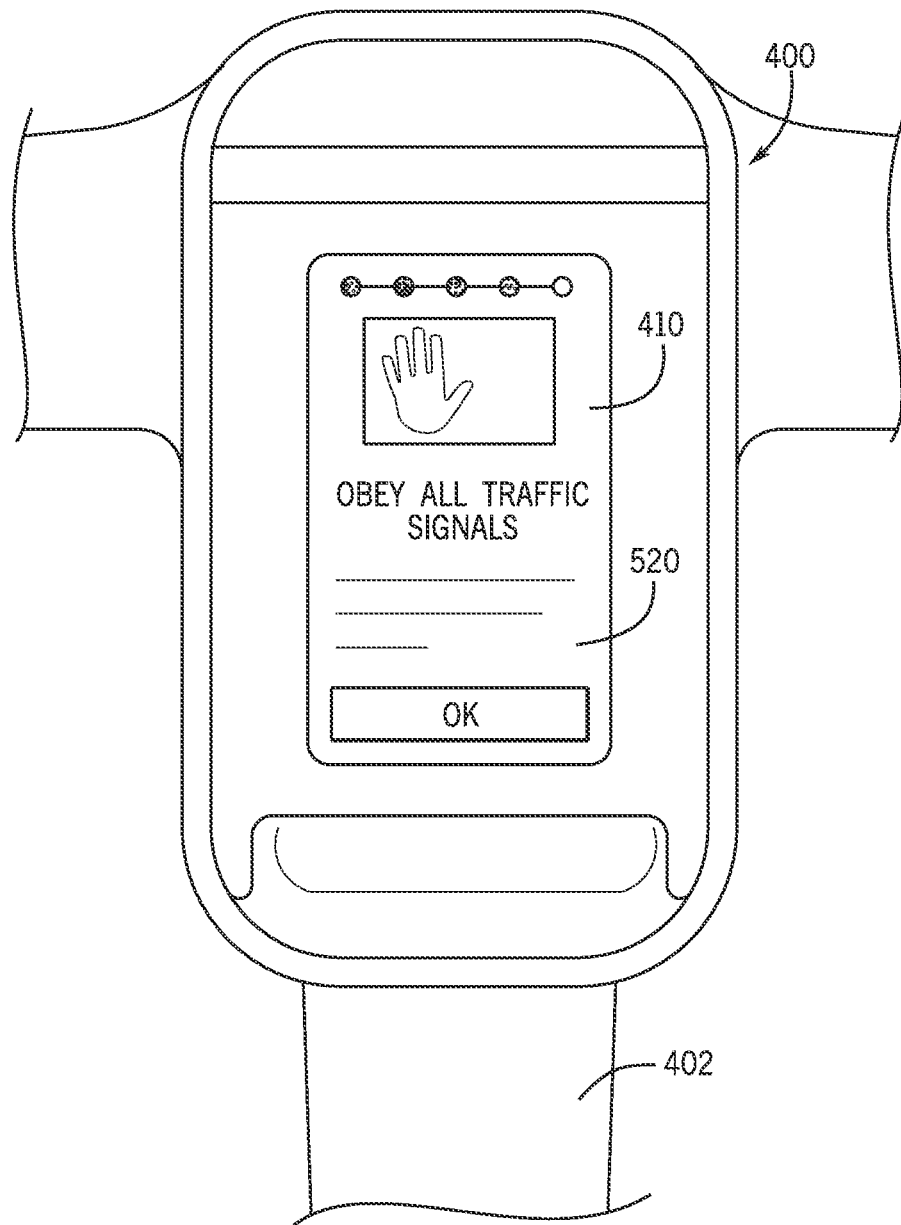

FIGS. 5A, 5B, and 5C illustrate respective diagrams of various examples of information rendered on the display 410 of the user interface 400 in accordance with an embodiment of the disclosure. The display 410 may render various information and different times, such as during operation of the micromobility transit vehicle 402, which includes starting, during, or ending a trip or prior to starting use or after ending a ride of the micromobility transit vehicle 402. For example, as shown in FIG. 5A, the display 410 may render one or more prompts, buttons, or selectable commands (hereinafter "options" 500 for sake of convenience, without intent to limit) for selection. The options 500 may prompt user selection to begin a ride, end a ride, pause a ride, or modify a ride, among others. In some embodiments, the options 500 rendered on the display 410 may allow user selection of one or more navigational commands, such as setting a starting location, setting a destination, starting navigational guidance, ending navigational guidance, modifying an existing navigation route, or the like. In some embodiments, the options 500 rendered on the display 410 may allow a transportation requester or rider to unlock the micromobility transit vehicle 402 from a docking station, pair the micromobility transit vehicle 402 to a docking station, request service or maintenance of the micromobility transit vehicle 402, report issues with the micromobility transit vehicle 402, and the like. In some embodiments, the options 500 rendered on the display 410 may allow the rider to turn on a head light assembly, turn off the head light assembly, or otherwise control operation of one or more systems of the micromobility transit vehicle 402.

Referring to FIG. 5B, the display 410 may render one or more notifications 510 related to operation of the micromobility transit vehicle 402. For instance, the display 410 may render use agreements, local rules and regulations, liability waivers, operation instructions, operation reminders, and the like for acknowledgment by the rider before, during, or after use. Referring to FIG. 5C, the display 410 may render one or more notifications 520 based on a detected condition of the micromobility transit vehicle 402. For example, the display 410 may render one or more notifications of a detected use violation (e.g., excessive speed detection, traffic signal violation, etc.), parking violation (e.g., on street, within a landscaped area, within a handicapped zone, etc.), lock violation (e.g., free locking, to an improper sign or structure, failure to lock, etc.), or any combination thereof. In other embodiments, the notifications need not be for a violation, but can be for conveying changes during operation of the micromobility transit vehicle 402, providing warnings of upcoming hazards or congestion along the ride or trip, providing reminders for use or operation, providing messages at the start and/or end of a ride, including positive messages if the user has complied with all use regulations or guidelines during the trip or user account updates, such as status, number of rides completed, or total distance traveled on the ride or over multiple rides, and offers or advertisements, such as when the micromobility transit vehicle 402 is detected as being stationary or stopped.

Figure 6:
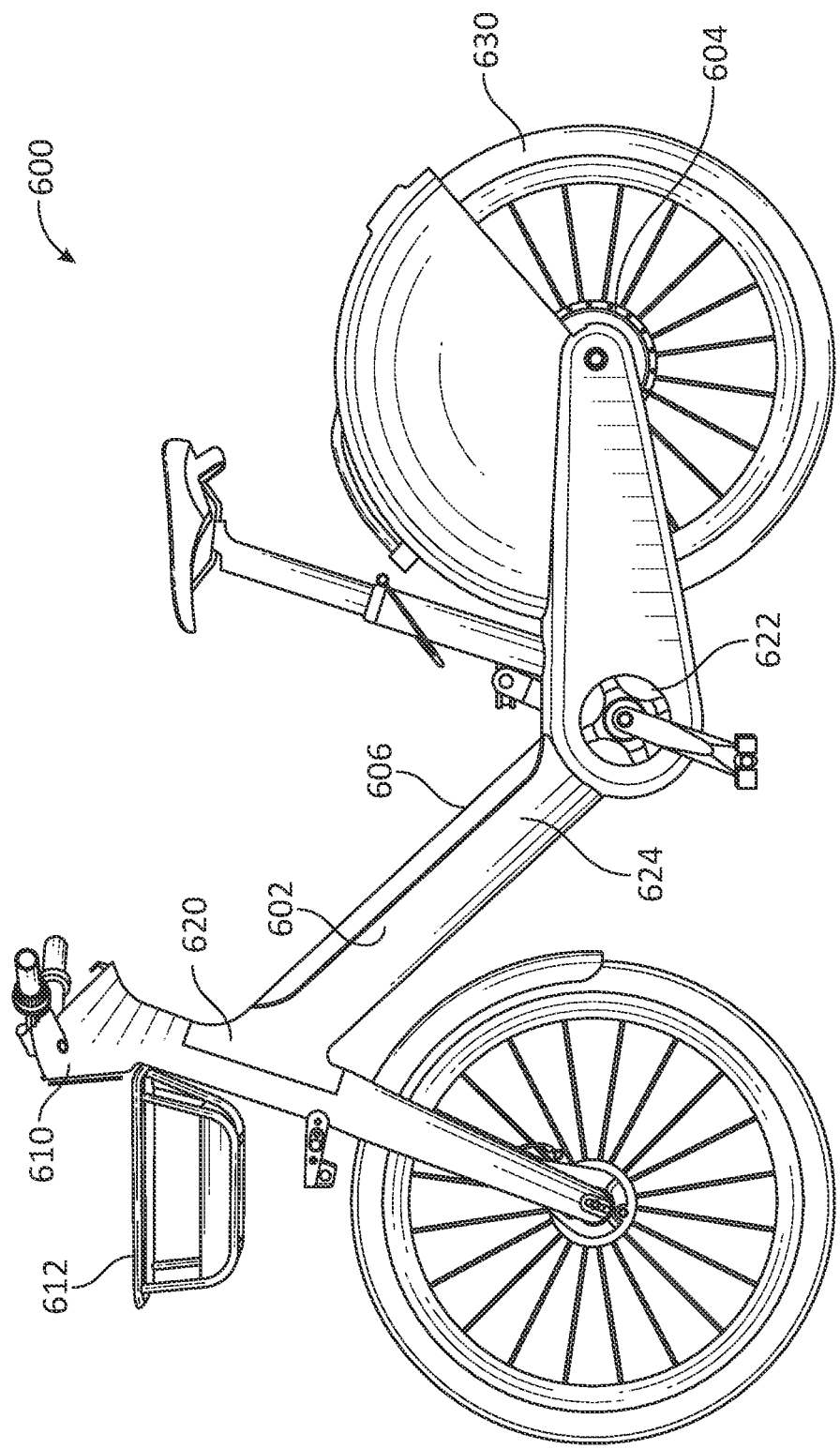
FIG. 6 illustrates a side view of a micromobility transit vehicle, in accordance with an embodiment of the disclosure.

FIG. 6 illustrates a side view of a micromobility transit vehicle 600, in accordance with an embodiment of the disclosure. The micromobility transit vehicle 600 includes a frame 602, a propulsion system 604, and a battery 606. In embodiments, the micromobility transit vehicle 600 may include a cockpit assembly 610 and a storage basket 612. The micromobility transit vehicle 600 may be similar to any one of transit vehicles 110b, 110c, or 110d, described above. Thus, any description above of like features is incorporated herein for micromobility transit vehicle 600.

The frame 602 may include many configurations. For example, the frame 602 may include any number of tubes, brackets, and other components, such as a headtube 620, a bottom bracket 622, a downtube 624 extending between the headtube 620 and the bottom bracket 622. The bottom bracket 622 may rotatably support a portion of the propulsion system 604, such as a crankset configured to drive a rear wheel 630 through reciprocating motion of a rider's legs. In some embodiments, the frame 602 may include other tubes, such as a seat tube supporting a seat. In some embodiments, the frame 602 may include a top tube, though such is not required, as illustrated in FIG. 6. Thus, the frame 602 may include any number of frame members coupled together to form a support structure for the various components of the micromobility transit vehicle 600.

The propulsion system 604 may be any system or device operable to provide a motive force to at least one wheel of the micromobility transit vehicle 600 (e.g., the rear wheel 630) to propel the micromobility transit vehicle 600 across a surface (e.g., a road surface, a sidewalk, a path, a trail, etc.). The propulsion system 604 may be similar to propulsion system 122 described above, such as including an electric motor configured to drive a rotation of a wheel (e.g., the rear wheel 630) of micromobility transit vehicle 600. In some embodiments, at least some portions of the propulsion system 604 may be housed within the frame 602 or other portions (e.g., housings) of the micromobility transit vehicle 600. As shown, the electric motor may define a portion of the rear wheel 630. For example, the electric motor may define at least a portion of a hub of the rear wheel 630.

The battery 606 may be configured to provide electric power to the micromobility transit vehicle 600. For example, the battery 606 may be configured to provide electric power to the propulsion system 604 (e.g., to the electric motor) to propel the micromobility transit vehicle 600, for example, as well as to various other modules of the micromobility transit vehicle 600. The battery 606 may be implemented with one or more battery cells, controllers, and/or safety measures. For example, the battery 606 may include thermal interlocks and one or more logic devices, sensors, and/or a display to monitor and provide visual feedback of a charge status of the battery 606 (e.g., a charge percentage, a low charge indicator, etc.). The battery 606 may be similar to battery 124 described above.

Other modules powered by the battery 606 may include other and/or additional sensors, actuators, communications modules, and/or user interface devices, for example. In some embodiments, the other modules may include one or more proximity sensors, cameras, lights (e.g., a headlight, indicator lights, etc.), alarms, environmental sensors, dynamic sensors, propulsion control systems, and the like. In some embodiments, the battery 606 may include an architecture similar to that described in U.S. patent application Ser. No. 16/728,600, filed Dec. 27, 2019, and entitled "VEHICLE BATTERY INTEGRATION SYSTEMS AND METHODS," or in U.S. patent application Ser. No. 16/836,259, filed Mar. 31, 2020, and entitled "VEHICLE BATTERY SECURING SYSTEMS AND METHODS," which are incorporated herein by reference in their entireties.

In embodiments, battery 606 may be receivable within a battery compartment disposed in the frame 602 (e.g., the downtube 624). As a result, the battery 606 may be integrated into or placed within the frame 602, rather than exposed. For example, at least a portion of the battery 606 may be positioned within the battery compartment to secure the battery 606 to the frame 602. In such embodiments, the battery compartment may be shaped to receive the battery 606 or at least a portion of the battery 606 therein. Such configurations may provide a secure attachment of the battery 606 to the frame 602. Additionally, or alternatively, such configurations may provide an attachment that is less prone to vandalism and/or damage or at least limits vandalism and/or damage to the battery 606. For example, receipt of the battery 606 at least partially within the battery compartment may shield vulnerable portions of the battery 606 positioned within the frame 602. In embodiments, the battery 606 and/or the securement of the battery 606 within the battery compartment may be similar to that described in U.S. patent application Ser. No. 16/917,102, filed Jun. 30, 2020, and entitled "MICROMOBILITY TRANSIT VEHICLE BATTERY CONNECTION AND LOCK SYSTEMS AND METHODS," which is incorporated herein by reference in its entirety.

The cockpit assembly 610 may provide a functional, intuitive, and distinctive cockpit or user interface for the rider when riding the micromobility transit vehicle 600. For example, the cockpit assembly 610 may be implemented with several interfaces, components, or features allowing the rider to see, verify, or control one or more operations of the micromobility transit vehicle 600. The cockpit assembly 610 may form at least part of an outer housing for the micromobility transit vehicle's handlebars. In some embodiments, the cockpit assembly 610 may include user interface 400 described above. In some embodiments, the cockpit assembly 610 may be similar to the cockpit assembly disclosed in U.S. patent application Ser. No. 16/729,070, filed Dec. 27, 2019, and entitled "MICRO-MOBILITY FLEET VEHICLE COCKPIT ASSEMBLY SYSTEMS AND METHODS," which is incorporated herein in its entirety for all purposes.

The storage basket 612 may be coupled to frame 602, such as to the headtube 620, and may provide one or more functional benefits. For instance, the storage basket 612 may be configured to store a rider's belongings during a ride. In some examples, the storage basket 612 may be configured to provide a locking function. For example, the micromobility transit vehicle 600 may be locked or otherwise secured to a docking station or other stationary object via one or more components of the storage basket 612, such as a lock cable of the storage basket 612. In some embodiments, the storage basket 612 may be similar to the storage basket disclosed in U.S. patent application Ser. No. 15/930,195, filed May 12, 2020, and entitled "MICROMOBILITY TRANSIT VEHICLE LOCK-TO MECHANISM SYSTEMS AND METHODS," which is incorporated herein in its entirety for all purposes.

Figure 7:
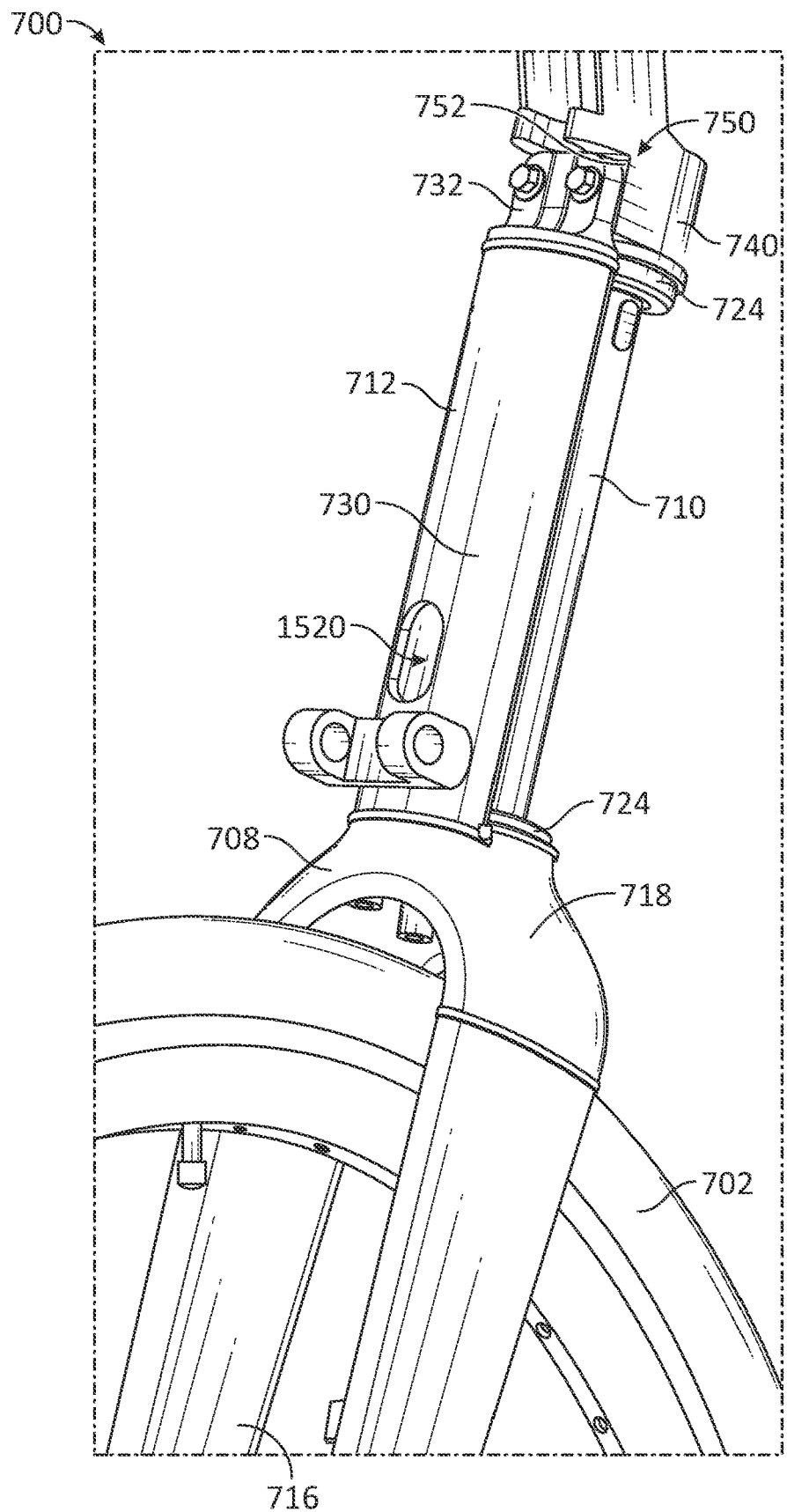
FIG. 7 illustrates a front diagram of a steering assembly, in accordance with an embodiment of the disclosure.

FIG. 7 illustrates a front diagram of a steering assembly 700 of micromobility transit vehicle 600, in accordance with an embodiment of the disclosure. The steering assembly 700 is configured to steer micromobility transit vehicle 600. For example, steering assembly 700 is coupled to a front wheel 702 of micromobility transit vehicle 600 to turn the front wheel 702 under user manipulation of steering assembly 700. For example, steering assembly 700 may be rotated by the rider of micromobility transit vehicle 600 to turn the front wheel 702 and steer the micromobility transit vehicle 600 as desired. In some embodiments, steering assembly 700 may be designed with increased stiffness and strength to account for repeated use under a wide range of load requirements. For example, the steering assembly 700 may be suited for ridesharing use and requirements, although other configurations are contemplated.

The steering assembly 700 may include a fork 708, a steer tube 710 extending from the fork 708, and a stiffening brace 712 extending from the fork 708. The fork 708 may be coupled to the front wheel 702, such as defining a pair of front dropouts or fork ends to which the front axle is connected to couple the front wheel 702 to the fork 708. As shown, the fork 708 includes a pair of rigid blades 716 that are joined at the top by a fork crown 718, although other configurations are contemplated, including single blade and suspension fork configurations.

The steer tube 710 (e.g., referred to as a steerer tube in some examples) may extend from the fork crown 718 to define a structure about which the steering assembly 700 is rotated to steer the micromobility transit vehicle 600. For example, the steer tube 710 may be positioned to rotate within the headtube 620 of frame 602, such as interfacing with the headtube 620 via a pair of headset bearings 724 (e.g., a headset) mounted in the headtube 620, as detailed below. Rider manipulation of steering assembly 700 (e.g., via a handlebar) may rotate the steer tube 710 within the headtube 620 about a steer axis to steer micromobility transit vehicle 600 as desired.

The stiffening brace 712 (e.g., referred to as a crown extension, a brace, or a brace/stiffening member in some examples) may extend from the fork crown 718 to increase a stiffness or rigidity of steering assembly 700. For example, stiffening brace 712 may extend parallel to, and offset from, the steer tube 710 to increase a torsional rigidity of steering assembly 700 to account for expected loads experienced by micromobility transit vehicle 600 (e.g., rider weight, loads positioned within storage basket 612, vehicle abuse, etc.). As a result, the steer tube 710 and stiffening brace 712 may define a double beam structure for increased strength. In embodiments, stiffening brace 712 extend from the fork 708 to be positioned at least partially about the headtube 620, as detailed below. For example, stiffening brace 712 may be positioned such that rotation of steering assembly 700 about the steer tube 710 rotates the stiffening brace 712 about the headtube 620.

As shown, the stiffening brace 712 includes a main body 730 extending from the fork 708, and a terminal end 732 extending from (or defined at the end of) the main body 730. In embodiments, the terminal end 732 may have a reduced dimension (e.g., thickness) compared to the main body 730 to facilitate attachment of the stiffening brace 712 to the stem, as described below. Depending on the application, the terminal end 732 may be defined as one or multiple tabs (e.g., a pair of tabs), although other configurations are contemplated.

With continued reference to FIG. 7, steering assembly 700 may include a stem 740 coupled to the steer tube 710 and the stiffening brace 712 to secure the steering assembly 700 to the headtube 620. For example, stem 740 may include a threadless design, with the stem 740 clamped around the steer tube 710. The stiffening brace 712 may be secured to the stem 740 to complete the double beam structure. As a result, the ends of the stiffening brace 712 and steer tube 710 may be connected to the same structure for increased strength and rigidity.

In embodiments, the connection between the stem 740 and the stiffening brace 712 may be designed to rotationally lock the stem 740 and stiffening brace 712 together. For example, the engagement of the stiffening brace 712 with the stem 740 may clock the stem 740 and stiffening brace 712 together, such as maintaining engagement of the stem 740 with the stiffening brace 712 during rotation of the steering assembly 700. Depending on the application, the stiffening brace 712 may include a first engagement surface 750, and the stem 740 may include a second engagement surface 752 complementary to the first engagement surface 750 and engaged with the first engagement surface 750 to rotationally lock the stem 740 and stiffening brace 712 together. As a result, movement of the stem 740 relative to the stiffening brace 712 may be limited or prevented to tie rotation of the stem 740 with rotation of the stiffening brace 712 and/or maintain alignment of the stem 740 with the stiffening brace 712.

Figure 8:
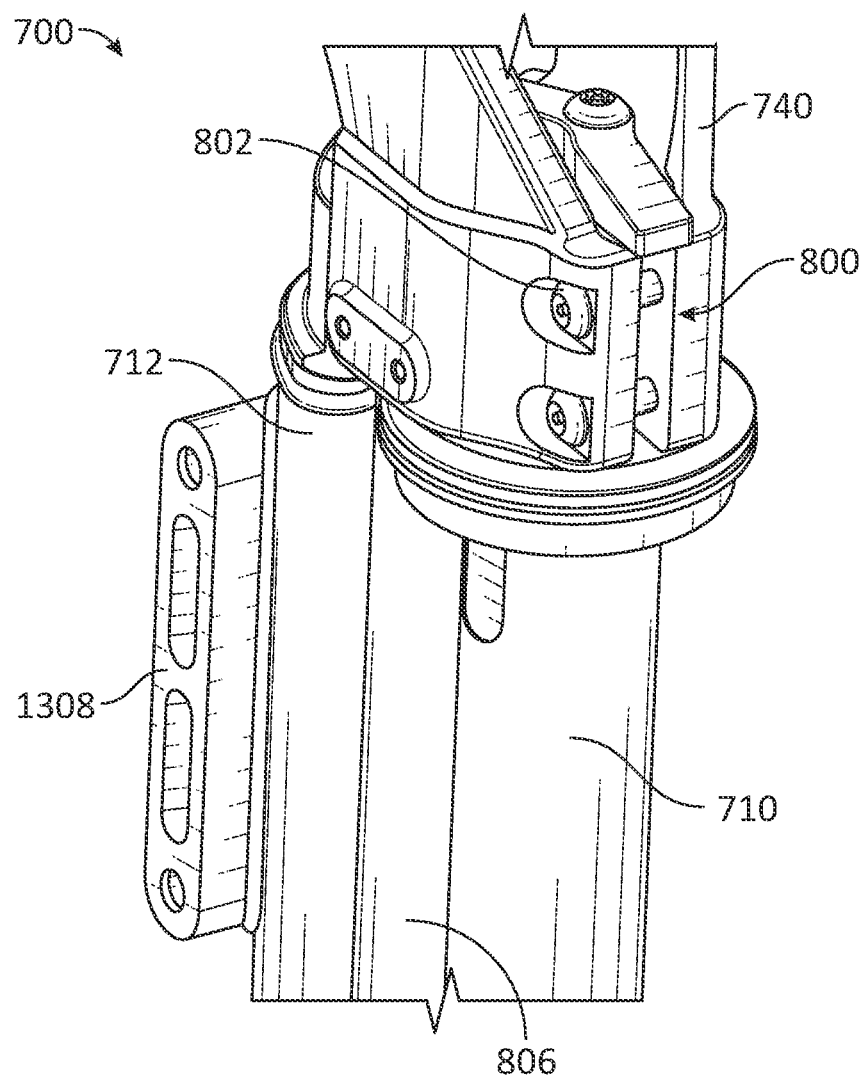
FIG. 8 illustrates a rear diagram of the steering assembly, in accordance with an embodiment of the disclosure.

FIG. 8 illustrates a rear diagram of the steering assembly 700, in accordance with an embodiment of the disclosure. Referring to FIG. 8, the stem 740 may be coupled to the steer tube 710 via a pinch joint 800. For example, stem 740 may include a split configuration, with one or fasteners 802 clamping the stem 740 onto the steer tube 710. In such embodiments, the circumference of the stem bore is pinched around the steer tube 710. In embodiments, stiffening brace 712 may include an inner surface 806 shaped to fit the stiffening brace 712 around the headtube 620. For example, the inner surface 806 of stiffening brace 712 may be concave and shaped to fit around a convex outer surface of the headtube 620. The above configurations may allow the stiffening brace 712 to rotate about the headtube 620 as the steering assembly 700 is rotated.

Figure 9:
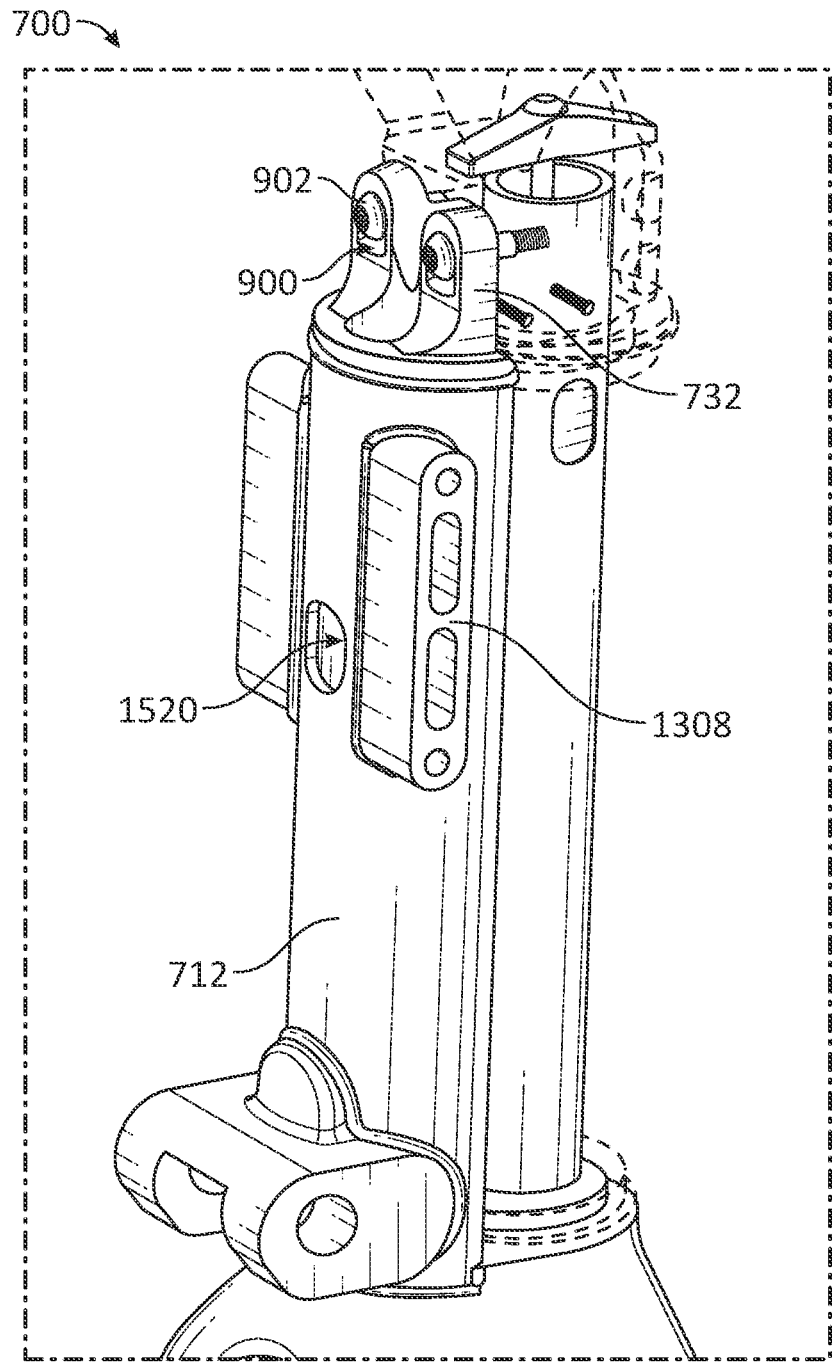
FIG. 9 illustrates a front diagram of the steering assembly with a portion of the steering assembly shown transparent for illustration purposes, in accordance with an embodiment of the disclosure.

FIG. 9 illustrates a front diagram of the steering assembly 700 with the stem 740 shown transparent for illustration purposes, in accordance with an embodiment of the disclosure. Referring to FIG. 9, the steering assembly 700 may include a slotted hole 900 disposed in the stiffening brace 712, such as disposed in the terminal end 732. For example, a slotted hole 900 may be disposed in each tab of the terminal end 732. A fastener 902 may be disposed in each slotted hole 900 and coupled to the stem 740 to secure the stiffening brace 712 to the stem 740. As described in more detail below, the slotted hole(s) 900 may be shaped to allow for axial adjustment of the stem 740 relative to the stiffening brace 712. For example, the fastener(s) 902 may slide within the slotted hole(s) 900 to allow axial movement of the stem 740 along the steer tube 710 to, for instance, fit the steering assembly 700 to the headtube 620 and/or adjust a bearing preload. Accordingly, the slotted holes 900 may be slotted vertically to allow for vertical adjustment of the stem 740.

Figure 10:
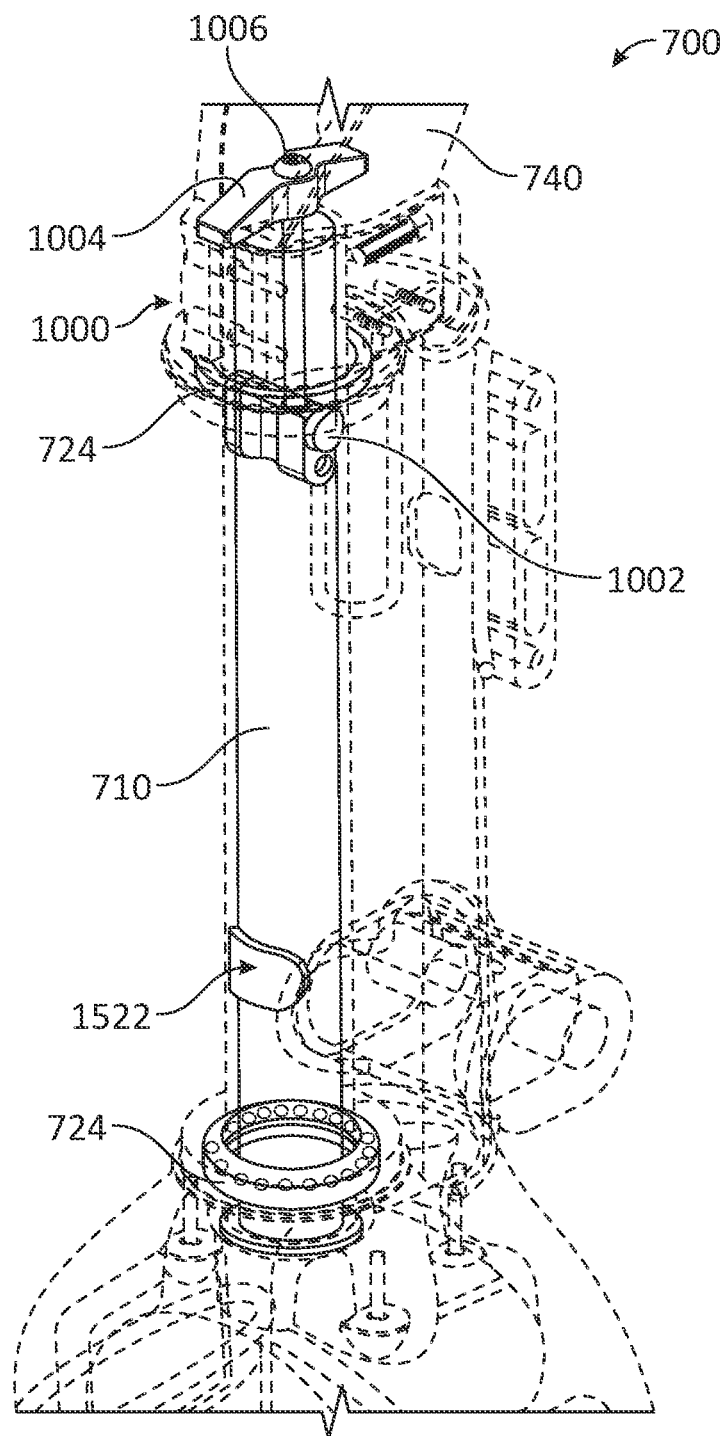
FIG. 10 illustrates a rear diagram of the steering assembly with other portions of the steering assembly shown transparent for illustration purposes to highlight a preload assembly, in accordance with an embodiment of the disclosure.

FIG. 10 illustrates a rear diagram of the steering assembly 700 with portions of the steering assembly 700 shown transparent for illustration purposes to highlight a preload assembly, in accordance with an embodiment of the disclosure. Referring to FIG. 10, the steering assembly 700 may include a preload assembly 1000 configured to adjust a headset bearing preload. The preload assembly 1000 may include one or more features to draw the headset bearings 724 together at a desired headset bearing preload. For example, the preload assembly 1000 may include a cross pin 1002 associated with the steer tube 710, a bridge 1004 engaging the stem 740, and a bolt 1006 extending between the bridge 1004 and the cross pin 1002, although other configurations are contemplated.

The cross pin 1002 may be coupled to or defined in the steer tube 710, such as positioned within the interior bore of the steer tube 710. The bridge 1004 may engage the top of the stem 740, such as positioned at least partially within a seat defined in the stem 740. The bolt 1006 may extend from the bridge 1004 for threaded engagement with cross pin 1002. The bolt 1006 may be adjusted to adjust the headset bearing preload. For example, a tension of the bolt 1006 may be adjustable to draw the stem 740 and fork 708 together to apply axial preload to the headset bearings 724. For instance, adjusting the bolt 1006 may draw the steer tube 710 towards the stem 740 to adjust a preload compressing the headset bearings 724 together and into the headtube 620.

Figure 11:
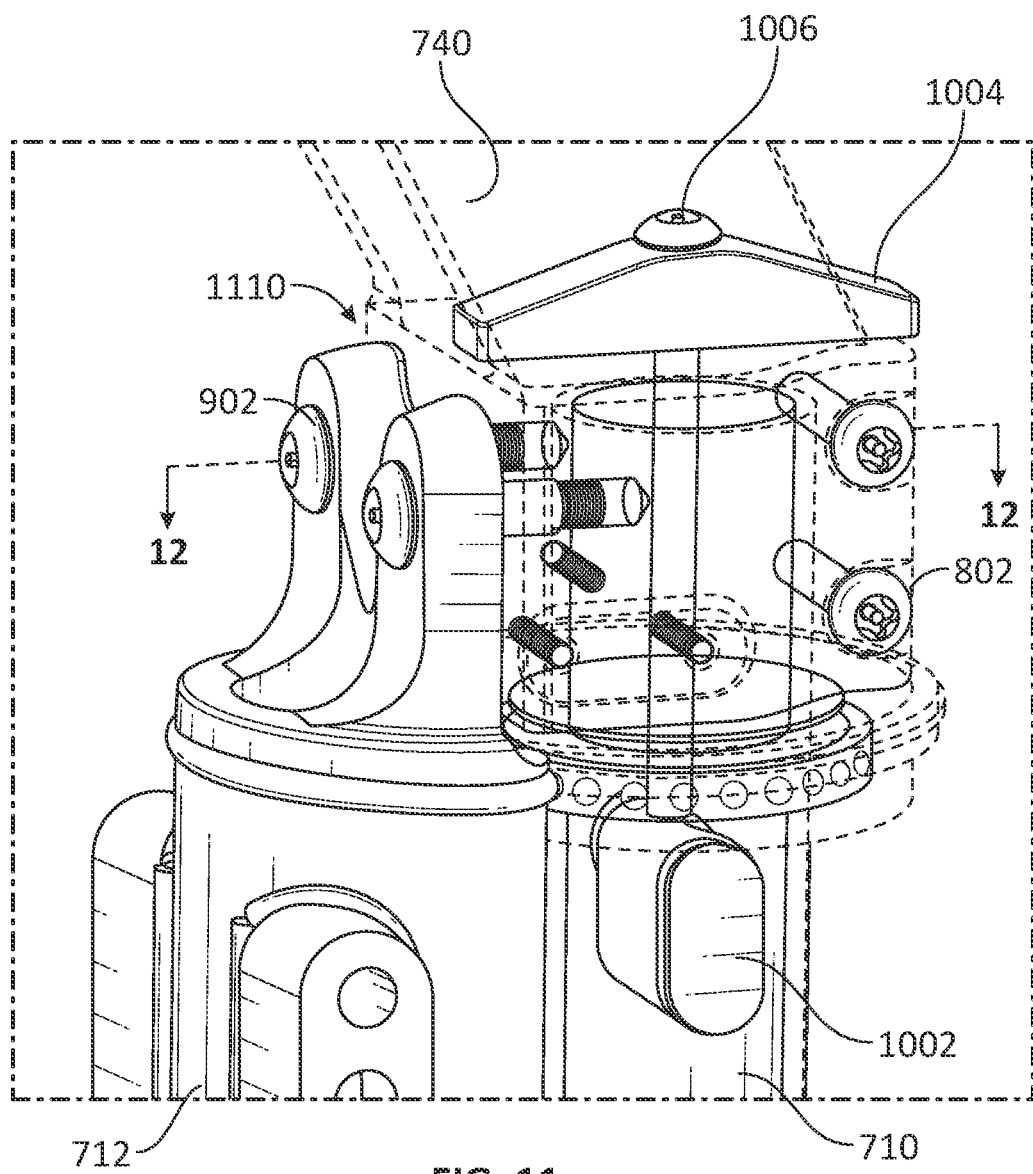
FIG. 11 illustrates a diagram of the steering assembly with a stem of the steering assembly shown transparent for illustration purposes to highlight the connection of the stem with other portions of the steering assembly, in accordance with an embodiment of the disclosure.
Figure 12:
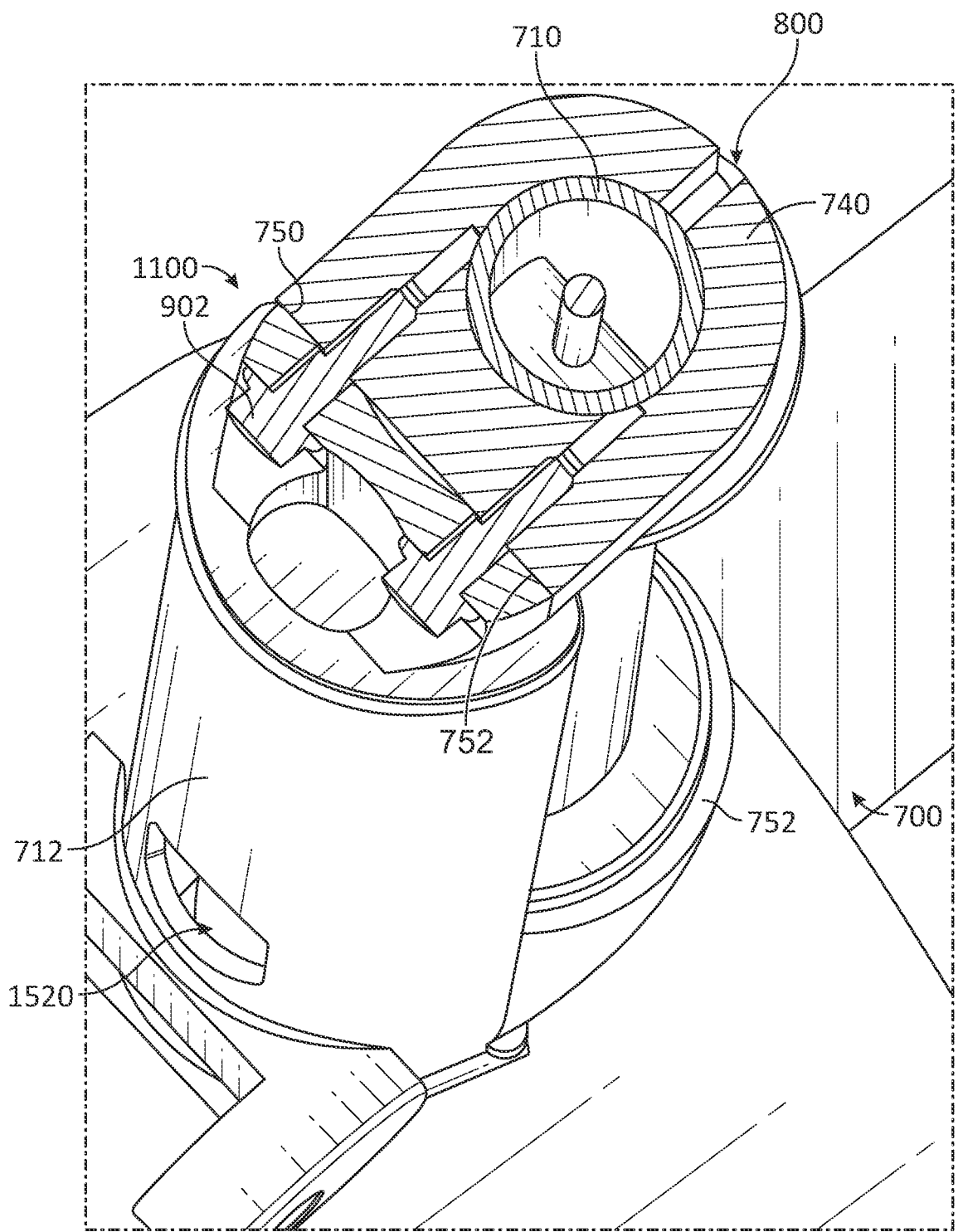
FIG. 12 is a cross-sectional view of the steering assembly taken along line 12-12 of FIG. 11, in accordance with an embodiment of the disclosure.

FIG. 11 illustrates a diagram of the steering assembly 700 with the stem 740 of the steering assembly 700 shown transparent for illustration purposes to highlight the connection of the stem 740 with the steer tube 710 and stiffening brace 712, in accordance with an embodiment of the disclosure. FIG. 12 is a cross-sectional view of the steering assembly 700 taken along line 12-12 of FIG. 11, in accordance with an embodiment of the disclosure. Referring to FIGS. 11-12, each of the first engagement surface 750 and the second engagement surface 752 may be a planar surface (see FIG. 12). As a result, the engagement surfaces may define a planar shear joint 1100 between the stiffening brace 712 and the stem 740 to rotationally lock the stem 740 and stiffening brace 712 together.

As shown, the stem 740 may be connected to the steer tube 710 and stiffening brace 712 via multiple connections. For example, the stem 740 may be connected to the steer tube 710 via a first connection (e.g., the pinch joint 800), and the stem 740 may be connected to the stiffening brace 712 via a second connection (e.g., the planar shear joint 1100). To connect the stem 740 to the steering assembly 700, the stem 740 may be slid at least partially onto the steer tube 710, with the first engagement surface 750 of stiffening brace 712 aligned and engaged with the second engagement surface 752 of stem 740. The fasteners 902 may be inserted through the slotted holes 900 of stiffening brace 712 to engage stem 740. Bridge 1004 may be seated in or onto stem 740, and bolt 1006 may be threaded to cross pin 1002. The bolt 1006 may then be adjusted to adjust the headset bearing preload as desired (e.g., to a specification). The fasteners 902 may then be fully tightened to secure stiffening brace 712 to stem 740, and fasteners 802 may be tightened to fully tighten the stem 740 onto the steer tube 710.

Figure 13:
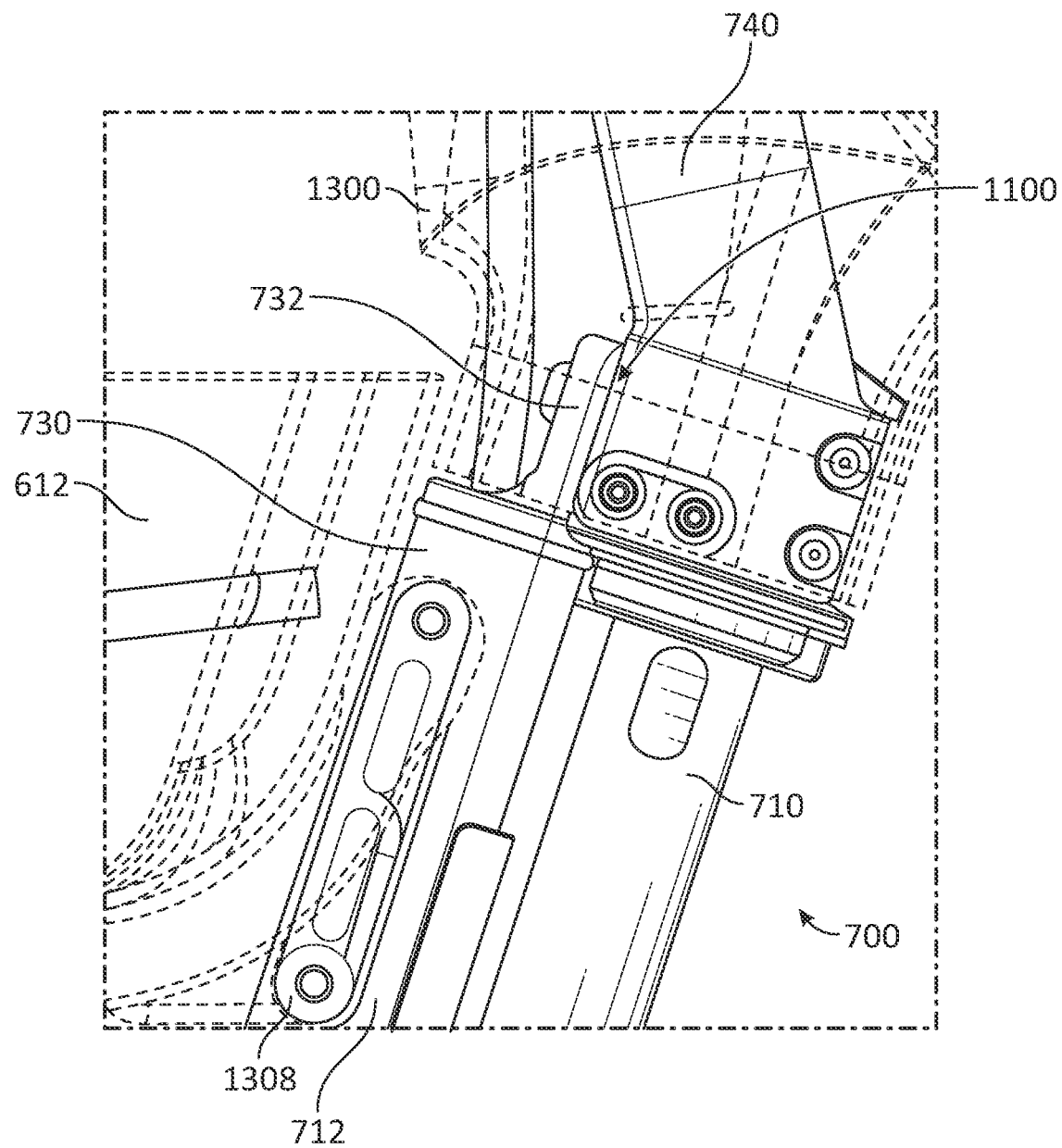
FIG. 13 illustrates a diagram of the steering assembly and showing a cockpit housing and storage basket connected to the steering assembly, in accordance with an embodiment of the disclosure.

FIG. 13 illustrates a diagram of the steering assembly 700 and showing a cockpit housing 1300 and storage basket 612 connected to the steering assembly 700, in accordance with an embodiment of the disclosure. Referring to FIG. 13, a cockpit housing 1300 of cockpit assembly 610 may be coupled to the steering assembly 700. For example, the cockpit housing 1300 may be coupled to the stem 740 to at least partially conceal the engagement of the stem 740 with the steer tube 710 and/or the engagement of the stem 740 with the stiffening brace 712. As shown, the cockpit housing 1300 may be shaped to sit flush with the stiffening brace 712. For example, the cockpit housing 1300 may sit flush with the main body 730 of stiffening brace 712 to streamline the micromobility transit vehicle 600 and provide a desired aesthetic and/or functional characteristic.

The terminal end 732 of stiffening brace 712 may be shaped to fit beneath the cockpit housing 1300 to, for example, reduce the form factor of cockpit housing 1300. For instance, the planar shear joint 1100 may be low profile to fit beneath the cockpit housing 1300. As a result, the mechanical connection between the stiffening brace 712 and the stem 740 may be densified to reduce both mass and packaging volume compared to other designs.

With continued reference to FIG. 13, storage basket 612 may be connected to stiffening brace 712. For example, as shown in at least FIGS. 8, 9, and 13, stiffening brace 712 may include a basket connection 1308. The storage basket 612 may be coupled to the basket connection 1308 to secure the storage basket 612 to the micromobility transit vehicle 600. In this manner, the storage basket 612 may rotate with rotation of steering assembly 700.

Figure 14:
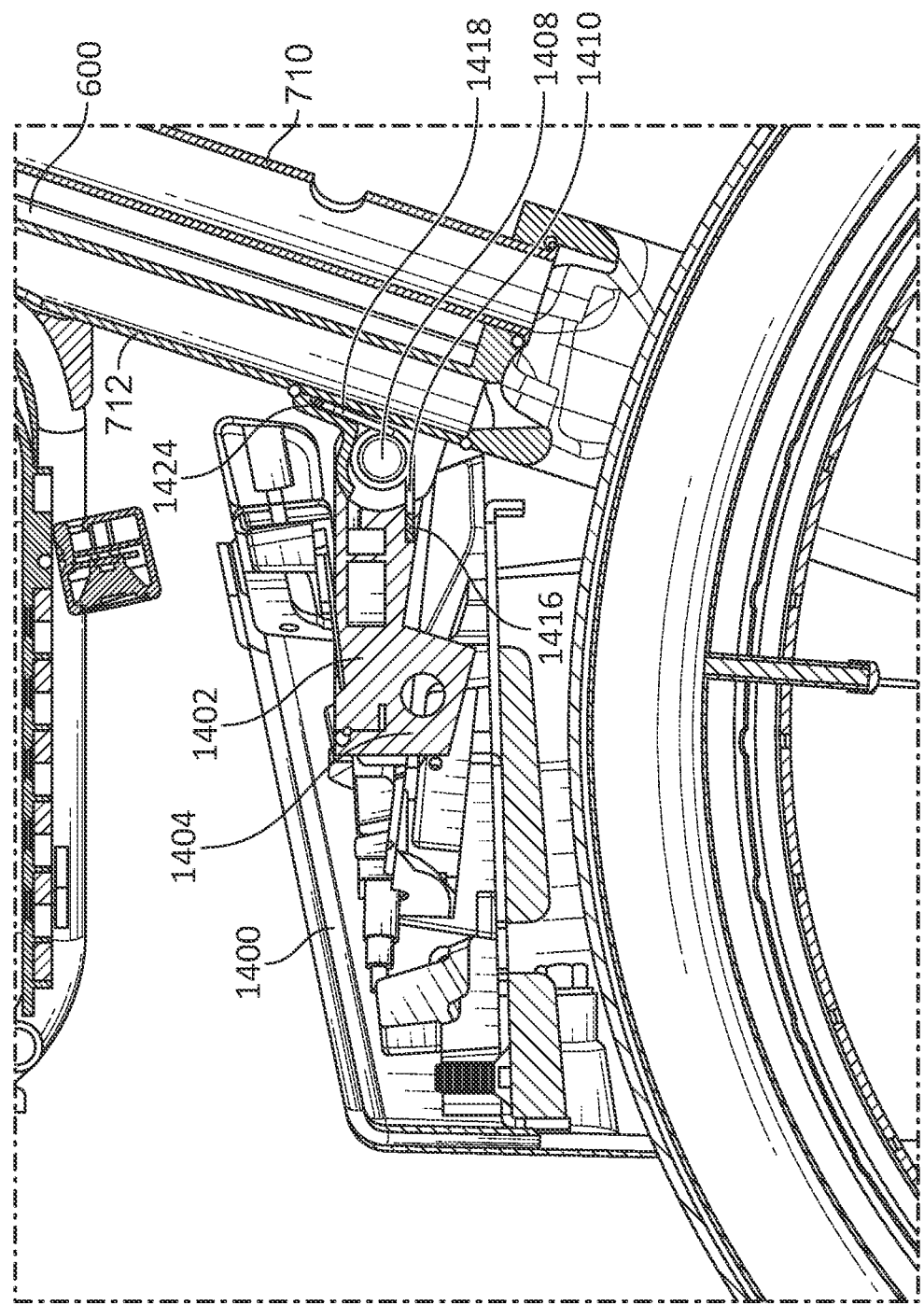
FIG. 14 illustrates a cross-sectional view of the micromobility transit vehicle connected to a docking station, in accordance with an embodiment of the disclosure.

FIG. 14 illustrates a cross-sectional view of the micromobility transit vehicle 600 connected to a docking station 1400, in accordance with an embodiment of the disclosure. Referring to FIG. 14, micromobility transit vehicle 600 may be configured for engagement with a docking station 1400 to lock and/or charge micromobility transit vehicle 600 when docked. For example, micromobility transit vehicle 600 may include a lock triangle 1402 (or other structure) secured to the stiffening brace 712 and configured to engage docking station 1400. For instance, lock triangle 1402 may include a hook 1404 that engages a pin and/or plate within docking station 1400 to lock micromobility transit vehicle 600 to docking station 1400. In some embodiments, engagement of lock triangle 1402 with docking station 1400 may electrically couple micromobility transit vehicle 600 to docking station 1400 to, for example, charge the battery 606 of micromobility transit vehicle 600. In embodiments, the lock triangle 1402 may be secured to docking station 1400 in a manner similar to that described in U.S. patent application Ser. No. 16/179,564, filed Nov. 2, 2018, and entitled "LOCKING MECHANISM FOR A BICYCLE SHARING SYSTEM," or in U.S. patent application Ser. No. 13/591,627, filed Aug. 22, 2012, and entitled "METHOD AND APPARATUS FOR SECURING A MOVABLE ITEM TO A STRUCTURE," which are hereby incorporated by reference in their entireties.

Referring to FIG. 14, the lock triangle 1402 may be configured to facilitate engagement of lock triangle 1402 with docking station 1400 under various conditions. For example, the lock triangle 1402 may be configured to pivot about a pin 1408 to account for ground surface and docking station variances. In embodiments, lock triangle 1402 may include a spring 1410 configured to bias the lock triangle 1402 to a neutral position about the pin 1408. For instance, spring 1410 may be sized and/or shaped to support the weight of lock triangle 1402 such that lock triangle 1402 may pivot about pin 1408 up or down to engage docking station 1400. As shown, the spring 1410 may include a first spring arm 1416 received within the lock triangle 1402 and a second spring arm 1418 nested within a cavity 1424 disposed in or adjacent to the stiffening brace 712. The lengths of the first and second spring arms 1416, 1418 may be selected to provide repeatable positioning of the lock triangle 1402 with respect to the ground (e.g., a ground plane). In some embodiments, the second spring arm 1418 may be a loop. In some embodiments, the first spring arm 1416 may be a pair of spring arms defined by ends of the spring 1410.

Figure 15:
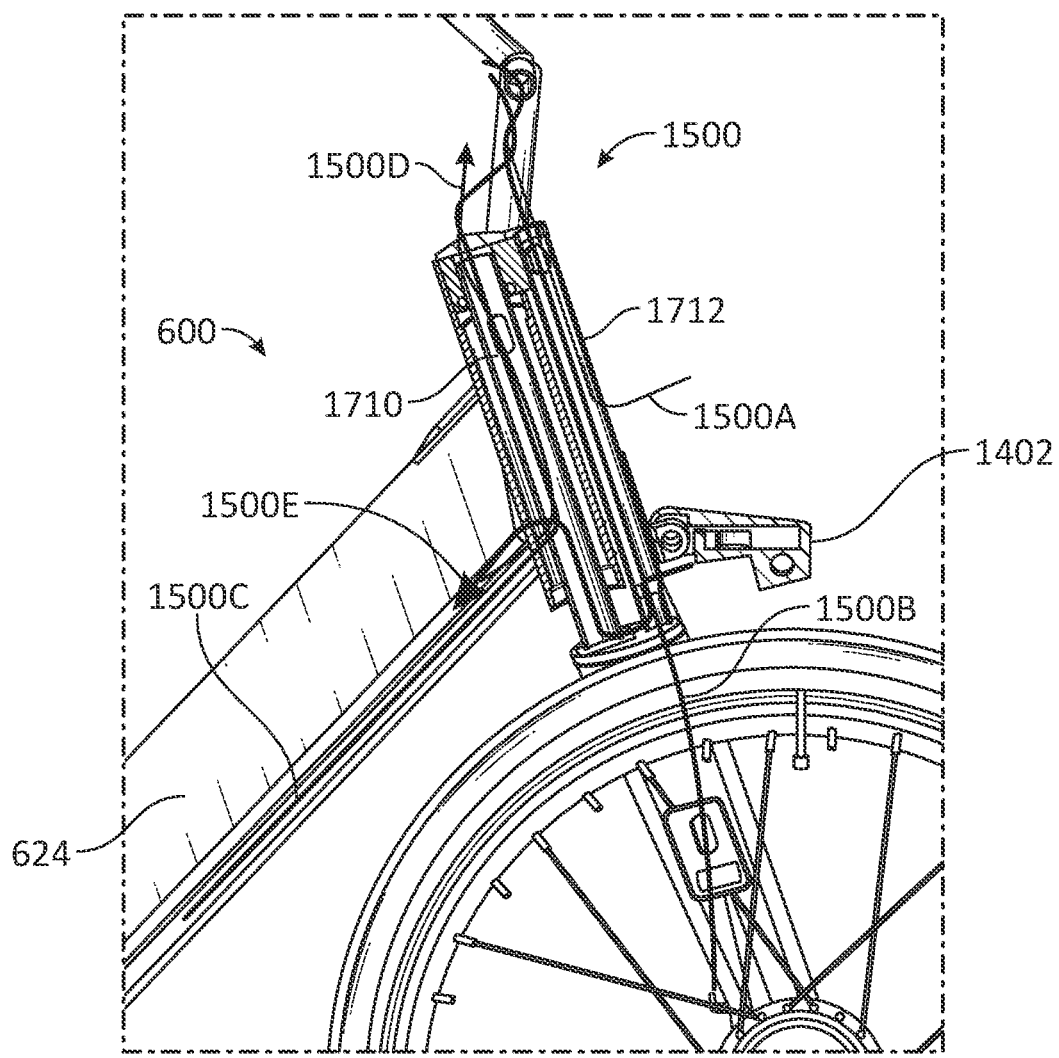
FIG. 15 illustrates a cable routing diagram of the micromobility transit vehicle, in accordance with an embodiment of the disclosure.

FIG. 15 illustrates a cable routing diagram of the micromobility transit vehicle 600, in accordance with an embodiment of the disclosure. Referring to FIG. 15, one or more cables 1500 may be routed through at least one of the steer tube 710 or the stiffening brace 712 of the steering assembly 700. For example, multiple control cables (e.g., electrical, hydraulic, or steel (e.g., stainless steel)) may be routed through the steering assembly 700. As shown, a headlight cable 1500A may be routed at least partially through the stiffening brace 712 for connection to a headlight disposed in the cockpit assembly 610 and/or the storage basket 612. A front brake cable 1500B may also be routed at least partially through the stiffening brace 712 for connection with a front brake. A rear brake cable 1500C may be routed at least partially through the steer tube 710 for connection with a rear brake. In some embodiments, the rear brake cable 1500C may be routed through the downtube 624 to the rear brake. A VCU cable 1500D may be routed at least partially through the steer tube 710, such as to route the VCU cable 1500D from the cockpit assembly 610 to a motor controller or other component of the micromobility transit vehicle 600. In embodiments, a charge cable 1500E may be routed through at least a portion of the steering assembly 700 from the lock triangle 1402 to the battery 606. The above cables 1500 are exemplary only, and other cables may be routed at least partially through the steering assembly 700.

Referring to FIGS. 7, 9, 10, and 12, one or more cutouts may be disposed in the steer tube 710 and/or stiffening brace 712 to facilitate routing of the cables 1500 at least partially through the steering assembly 700. For example, referring to FIGS. 7, 9, and 12, a first cutout 1520 may be disposed in the stiffening brace 712 to facilitate routing of at least one of the headlight cable 1500A, the charge cable 1500E, or the front brake cable 1500B through the stiffening brace 712. Referring to FIG. 10, a second cutout 1522 may be disposed in the steer tube 710 to facilitate routing of at least one of the VCU cable 1500D, the charge cable 1500E, or the rear brake cable 1500C through the steer tube 710.

Figure 16:
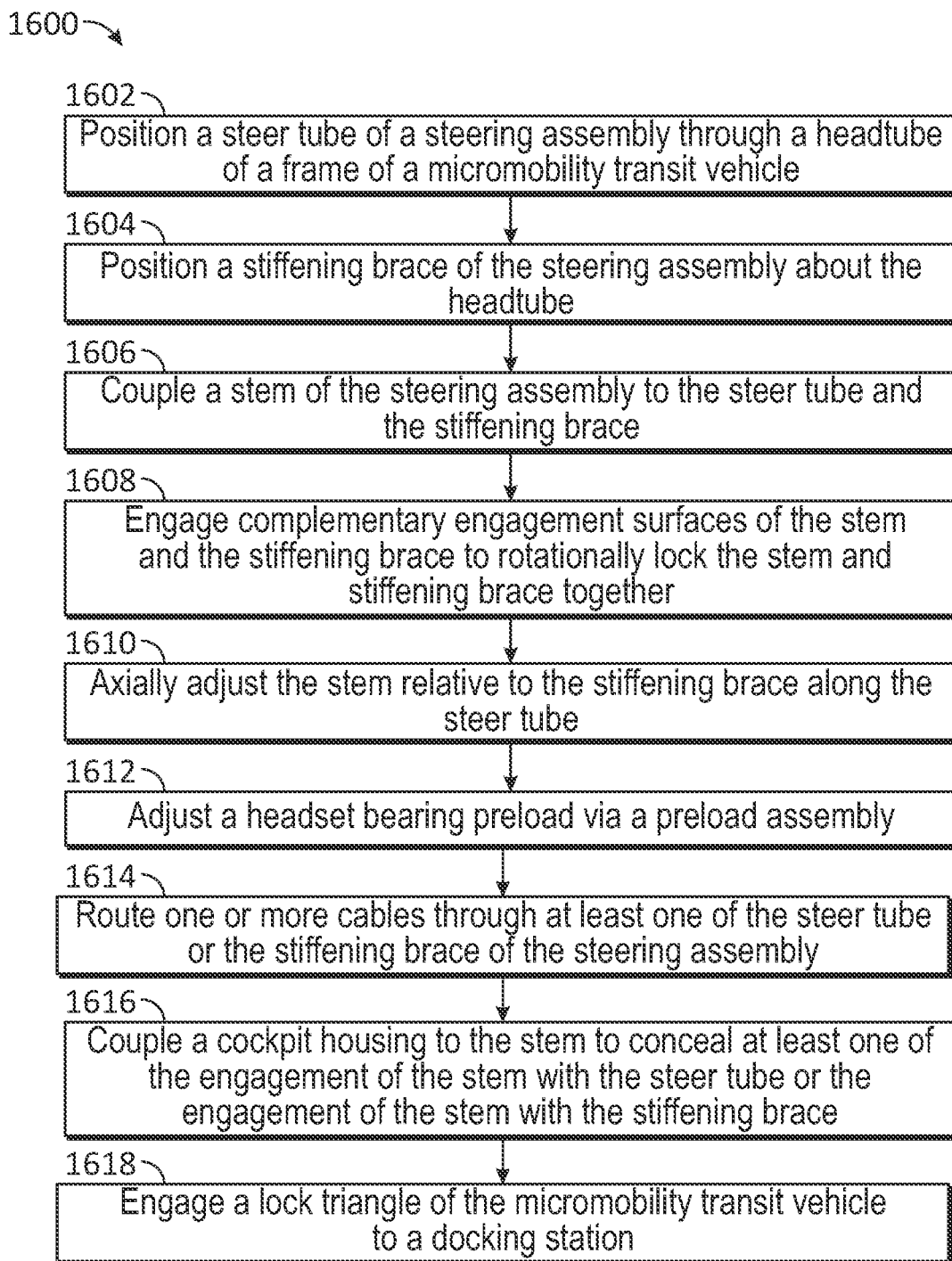
FIG. 16 illustrates a flow diagram of a process of coupling a steering assembly to a micromobility transit vehicle, in accordance with an embodiment of the disclosure.

FIG. 16 illustrates a flow diagram of a process 1600 of coupling a steering assembly to a micromobility transit vehicle, in accordance with an embodiment of the disclosure. It should be appreciated that any step, sub-step, sub-process, or block of process 1600 may be performed in an order or arrangement different from the embodiments illustrated by FIG. 16. For example, one or more blocks may be omitted from or added to the process 1600. Although process 1600 is described with reference to the embodiments of FIGS. 1-15, process 1600 may be applied to other embodiments.

The micromobility transit vehicle and steering assembly associated with process 1600 may be similar to micromobility transit vehicle 600 and steering assembly 700 described above. For example, steering assembly may include a fork, a steer tube extending from the fork, a stiffening brace extending from the fork, and a stem configured to connect to both the steer tube and the stiffening brace. In addition, micromobility transit vehicle may include a frame having a headtube.

In block 1602, process 1600 may include positioning the steer tube through the headtube of micromobility transit vehicle. For example, the steer tube may be positioned to rotate within the headtube. The steer tube may be rotatably coupled to the steer tube, such as via a pair of headset bearings (e.g., a headset). In this manner, rider manipulation of the steering assembly (e.g., via a handlebar) may rotate the steer tube within the headtube to steer the micromobility transit vehicle as desired.

In block 1604, process 1600 may include positioning the stiffening brace about the headtube. For example, the stiffening brace may extend parallel to the steer tube and positioned to rotate around the headtube with rotation of steering assembly. The stiffening brace may be low profile and shaped to accommodate rotation about the headtube. For instance, the stiffening brace may include a concave inner surface shaped to fit around a convex outer surface of the headtube.

In block 1606, process 1600 may include coupling the stem to the steer tube and the stiffening brace to secure the steering assembly to the headtube. Block 1606 may include securing the stem to the steer tube via a pinch joint. For example, the stem may be pinched around the steer tube. Block 1606 may include securing the stem to the stiffening brace via one or more fasteners received within slotted holes disposed in the stiffening brace. The slotted holes may allow for axial adjustment of the stem relative to the stiffening brace, such as allowing axial movement of the stem along the steer tube.

In block 1608, process 1600 may include engaging complementary engagement surfaces of the stem and the stiffening brace to rotationally lock the stem and stiffening brace together, such as explained above. For instance, the engagement surfaces of the stem and stiffening brace may be planar to define a planar shear joint between the stem and the stiffening brace to clock (or rotationally lock) the stem and stiffening brace together. Block 1608 may include securing the stem to the stiffening brace via the one or more fasteners to draw the complementary engagement surfaces together.

In block 1610, process 1600 may include axially adjusting the stem relative to the stiffening brace and along the steer tube. For example, the stem may be slid along the steer tube to seat the stem against the headtube to secure the steering assembly to the frame. The stem may be axially adjusted to align the connection of the stem with the stiffening brace and/or the steer tube. The stem may be axially adjusted to accommodate different headtube dimensions.

In block 1612, process 1600 may include adjusting a headset bearing preload via a preload assembly. The preload assembly may be similar to preload assembly discussed above. For example, preload assembly may include a cross pin associated with (e.g., disposed in, defined in, coupled to, etc.) the steer tube, a bridge engaging the stem, and a bolt extending between the bridge and the cross pin. Block 1612 may include adjusting a tension of the bolt to draw the stem and fork together to apply axial preload to a pair of headset bearings, such as explained above.

In block 1614, process 1600 may include routing one or more cables through at least one of the steer tube or the stiffening brace of the steering assembly. For example, one or more electrical or control cables may be routed through the steer tube and/or the stiffening brace between the vehicle's cockpit assembly/housing and various components of the vehicle. Depending on the application, power, data, control, or brake cables may be routed through the steer tube and/or the stiffening brace, such as described above.

In block 1616, process 1600 may include coupling a cockpit housing to the stem to conceal at least one of the engagement of the stem with the steer tube or the engagement of the stem with the stiffening brace. For example, the cockpit housing may be fastened to the stem to cover the engagements of the stiffening brace and the steer tube with the stem. The cockpit housing may be shaped to sit flush with at least a portion of the stiffening brace to streamline the cockpit design and provide a desired aesthetic and/or functional characteristic. In such embodiments, a terminal end of the stiffening brace may be shaped to fit beneath the cockpit housing to, for instance, reduce the form factor of the cockpit housing.

In block 1618, process 1600 may include engaging a lock triangle of the micromobility transit vehicle to a docking station. The lock triangle may be similar to lock triangle 1402 described above. For instance, the lock triangle may be rotatable about a pin and include a spring biasing the lock triangle to a neutral position about the pin, as described above. The lock triangle may engage the docking station to secure the micromobility transit vehicle. For instance, the lock triangle may be locked within the docking station to prevent unauthorized use of micromobility transit vehicle. In embodiments, engagement of the lock triangle with docking station may complete an electrical circuit to charge the micromobility transit vehicle (e.g., a battery of micromobility transit vehicle) while the vehicle is docked.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

One or more features or functions described herein may be included or omitted, or enabled or disabled on an opt-in basis, particularly for optimizing rider safety, comfort, and reliability. For example, a rider may choose to turn on or turn off, or use or not use, one or more of the features or functions described herein for their personal safety and comfort. In some instances, these features or functions may be turned on temporarily and/or turned on automatically to maximize rider safety and comfort, among various other possibilities.

All relative and directional references (including upper, lower, front, rear, and so forth) are given by way of example to aid the reader's understanding of the examples described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

The present disclosure teaches by way of example and not by limitation. Therefore, the matter contained in the above description or shown in the accompanying drawings should be interpreted as illustrative and not in a limiting sense. It should also be understood that numerous modifications and variations are possible in accordance with the principles of the present disclosure. The following claims are intended to cover all generic and specific features described herein, as well as all statements of the scope of the present method and system, which, as a matter of language, might be said to fall there between.

What is claimed is:

1. A micromobility transit vehicle comprising:
   a steering assembly comprising:
      a steer tube configured to rotate within a headtube of the micromobility transit vehicle, and
      a stiffening brace positioned about the headtube;
   a stem coupled to the steer tube and the stiffening brace and configured to rotationally lock the stem and the stiffening brace together, wherein the stem is coupled to the stiffening brace via a slotted hole of the stiffening brace, the slotted hole being configured with a shape to allow for axial adjustment of the stem along the steer tube and relative to the stiffening brace; and a preload assembly coupled to the steering assembly and the stem and configured to adjust a preload of the steering assembly.

2. The micromobility transit vehicle of claim 1, wherein the preload assembly is configured to adjust the preload in an axial direction along the steer tube.

3. The micromobility transit vehicle of claim 1, wherein the preload assembly is configured to adjust the preload by moving the steer tube relative to the stem.

4. The micromobility transit vehicle of claim 1, wherein the preload assembly comprises:
   a cross pin associated with the steer tube;
   a bridge associated with the stem; and
   a bolt extending between the bridge and the cross pin, wherein the bolt is adjustable to move the steer tube relative to the stem.

5. The micromobility transit vehicle of claim 4, wherein the cross pin is configured in a bore of the steer tube.

6. The micromobility transit vehicle of claim 4, wherein the bridge is engaged with a top surface of the stem.

7. The micromobility transit vehicle of claim 4, wherein the stem comprises a seat, and wherein the bridge is configured at least partially within the seat.

8. The micromobility transit vehicle of claim 4, wherein the bolt is threadedly coupled to the cross pin.

9. The micromobility transit vehicle of claim 1, further comprising a pair of headset bearings configured in the headtube.

10. The micromobility transit vehicle of claim 9, wherein the preload assembly is further configured to adjust a preload of the pair of head headset bearings.

11. The micromobility transit vehicle of claim 1, wherein the stem is coupled to the steer tube via a pinch joint.

12. The micromobility transit vehicle of claim 1, wherein the stiffening brace comprises a first engagement surface, and wherein the stem comprises a second engagement surface complementary to the first engagement surface and engaged with the first engagement surface.

13. A method of manufacturing a micromobility transit vehicle, the method comprising:
   positioning a steer tube of a steering assembly through a headtube of the micromobility transit vehicle;
   positioning a stiffening brace of the steering assembly about the headtube;
   coupling a stem to the steer tube and the stiffening brace to secure the steering assembly to the headtube and to rotationally lock the stem and the stiffening brace together, wherein the stem is coupled to the stiffening brace via a slotted hole of the stiffening brace, the slotted hole being configured with a shape to allow for axial adjustment of the stem along the steer tube and relative to the stiffening brace; and
   coupling a preload assembly to the steering assembly and the stem, wherein the preload assembly is configured to adjust a preload of the steering assembly.

14. The method of claim 13, further comprising adjusting the preload of the steering assembly in an axial direction along the steer tube via the preload assembly.

15. The method of claim 13, further comprising adjusting the preload of the steering assembly by moving the steer tube relative to the stem via the preload assembly.

16. The method of claim 13, wherein the preload assembly comprises:
   a cross pin associated with the steer tube;
   a bridge associated with the stem; and
   a bolt extending between the bridge and the cross pin, wherein the bolt is adjustable to move the steer tube relative to the stem.

17. The method of claim 16, wherein coupling the preload assembly to the steering assembly and the stem comprises coupling the cross pin to the steer tube and coupling the bridge to the stem.

18. The method of claim 16, further comprising adjusting the preload of the steering assembly by adjusting the bolt to move the steer tube relative to the stem.

19. The method of claim 13, further comprising configuring a pair of headset bearings in the headtube, wherein the preload assembly is further configured to adjust a preload of the pair of headset bearings.

* * * * *